United States Patent
Byun et al.

(10) Patent No.: US 12,010,577 B2
(45) Date of Patent: Jun. 11, 2024

(54) METHOD AND APPARATUS FOR LOSSLESS UPLINK DATA TRANSMISSION OF IAB NETWORK IN A WIRELESS COMMUNICATION SYSTEM

(71) Applicant: LG ELECTRONICS INC., Seoul (KR)

(72) Inventors: Daewook Byun, Seoul (KR); Heejeong Cho, Seoul (KR); Jian Xu, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 373 days.

(21) Appl. No.: 17/422,012

(22) PCT Filed: Feb. 10, 2020

(86) PCT No.: PCT/KR2020/001839
§ 371 (c)(1),
(2) Date: Jul. 9, 2021

(87) PCT Pub. No.: WO2020/166912
PCT Pub. Date: Aug. 20, 2020

(65) Prior Publication Data
US 2022/0104088 A1  Mar. 31, 2022

(30) Foreign Application Priority Data
Feb. 15, 2019 (KR) .......................... 10-2019-0017817

(51) Int. Cl.
*H04W 36/08* (2009.01)
*H04W 68/00* (2009.01)
*H04W 88/14* (2009.01)

(52) U.S. Cl.
CPC ......... *H04W 36/08* (2013.01); *H04W 68/005* (2013.01); *H04W 88/14* (2013.01)

(58) Field of Classification Search
CPC ........... H04W 36/0055; H04W 36/023; H04W 36/08; H04W 68/005; H04W 88/085; H04W 88/14
(Continued)

(56) References Cited

U.S. PATENT DOCUMENTS

2018/0049190 A1  2/2018  Abedini et al.
2021/0168667 A1*  6/2021  Byun ..................... H04W 36/02
(Continued)

OTHER PUBLICATIONS

Qualcomm Inc., et al., "IAB inter-CU Topology Adaptation for Arch 1a," R3-186456, 3GPP TSG-RAN WG3 Meeting #102, Spokane, USA, Nov. 2, 2018, section 2; and figures 1-2.
(Continued)

*Primary Examiner* — Robert J Lopata
(74) *Attorney, Agent, or Firm* — BRYAN CAVE LEIGHTON PAISNER LLP

(57) ABSTRACT

A method and apparatus for lossless uplink data transmission of IAB network in a wireless communication system will be provided. A user plane (UP) of an integrated access and backhaul (IAB)-donor central unit (CU) in a wireless communication system receives, from a wireless device, uplink data through a source IAB-node. A UP of an IAB-donor CU receives, from the source IAB-node, at least one of a delivery status of the uplink data on the source IAB-node, wherein the wireless device handovers from the source IAB-node to a target IAB-node. A UP of an IAB-donor CU transmits, to a unit-control plane (CP) of the IAB-donor CU, a first message based on the at least one of the delivery status of the uplink data.

1 Claim, 22 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2021/0274381 A1* | 9/2021 | Teyeb ................... | H04L 1/1854 |
| 2021/0282050 A1* | 9/2021 | Adjakple .............. | H04L 1/1874 |
| 2021/0314809 A1* | 10/2021 | Teyeb ............... | H04W 28/0278 |

OTHER PUBLICATIONS

3GPP; TSGRAN; NG-RAN; Architecture description (Release 15), 3GPP TS 38.401 V15.4.0, Jan. 8, 2019, section 8.9.4; and figure 8.9.4-1.
CMCC, "Xn termination and Xn based mobility in IAB," R3-186624, 3GPP TSG-RAN WG3 Meeting #102, Spokane, USA, Nov. 3, 2018, section 2; and figure 2.
Huawei, "Principal steps of Inter-CU Topology Adaptation," R3-186529, 3GPP TSG-RAN WG3 Meeting #102, Spokane, USA, Nov. 2, 2018, section 2; and figure 2.
Sections 5.2 and 7.1 of 3GPP TS 38.470 V15.4.0.
Section 6 of 3GPP TR 38.874 V16.0.0.

\* cited by examiner

METHOD AND APPARATUS FOR LOSSLESS UPLINK DATA TRANSMISSION OF IAB NETWORK IN A WIRELESS COMMUNICATION SYSTEM

This application is the National Stage filing under 35 U.S.C. 371 of International Application No. PCT/KR2020/001839 filed on Feb. 10, 2020, which claims priority to Korean Patent Application No. 10-2019-0017817 filed on Feb. 15, 2019, the contents of which are hereby incorporated by reference herein in their entirety.

TECHNICAL FIELD

The present disclosure relates to a method and apparatus for lossless uplink data transmission of IAB network in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

One of the potential technologies targeted to enable future cellular network deployment scenarios and applications is the support for wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive multiple-input multiple-output (MIMO) or multi-beam systems in NR creates an opportunity to develop and deploy integrated access and backhaul (IAB) links. This may allow easier deployment of a dense network of self-backhauled NR cells in a more integrated manner by building upon many of the control and data channels/procedures defined for providing access to user equipments (UEs). Due to deployment of IAB links, relay nodes (relay transmission/reception points (rTRPs)) can multiplex access and backhaul links in time, frequency, or space (e.g. beam-based operation).

The operation of the different links may be on the same or different frequencies (also termed 'in-band' and 'out-band' relays). While efficient support of out-band relays is important for some NR deployment scenarios, it is critically important to understand the requirements of in-band operation which imply tighter interworking with the access links operating on the same frequency to accommodate duplex constraints and avoid/mitigate interference.

In addition, operating NR systems in mmWave spectrum presents some unique challenges including experiencing severe short-term blocking that may not be readily mitigated by present radio resource control (RRC)-based handover mechanisms due to the larger time-scales required for completion of the procedures compared to short-term blocking. Overcoming short-term blocking in mmWave systems may require fast radio access network (RAN)-based mechanisms for switching between rTRPs, which do not necessarily require involvement of the core network. The above described need to mitigate short-term blocking for NR operation in mmWave spectrum along with the desire for easier deployment of self-backhauled NR cells creates a need for the development of an integrated framework that allows fast switching of access and backhaul links. Over-the-air (OTA) coordination between rTRPs can also be considered to mitigate interference and support end-to-end route selection and optimization.

SUMMARY

IAB network consists of an IAB-donor and IAB-node(s) which have the relation of gNB central unit (gNB-CU) and gNB distributed unit (gNB-DU) defined in 5G NR. In CU-DU split, the gNB-DU can provide the gNB-CU with the feedback for whether data traffic is transmitted or not to the UE which has the RRC connection with the gNB-DU.

However, in multi-hop wireless backhaul system, a part of uplink data may not arrive to an IAB-donor-CU during a handover of a wireless device between patent IAB-nodes. Therefore, the studies for lossless uplink data transmission of IAB network in a wireless communication system are needed.

In an aspect, a method performed by a user plane (UP) of an integrated access and backhaul (IAB)-donor central unit (CU) in a wireless communication system is provided. The UP of the IAB-donor CU receives, from a wireless device, uplink data through a source IAB-node. The UP of the IAB-donor CU receives, from the source IAB-node, at least one of a delivery status of the uplink data on the source IAB-node, wherein the wireless device handovers from the source IAB-node to a target IAB-node. The UP of the IAB-donor CU transmits, to a unit-control plane (CP) of the IAB-donor CU, a first message based on the at least one of the delivery status of the uplink data.

In another aspect, a method performed by a control plane (CP) of an integrated access and backhaul (IAB)-donor central unit (CU) in a wireless communication system is provided. The CP of the IAB-donor CU receives, from a source IAB-node, a first message including a delivery status of the uplink data on the source IAB-node, wherein the first message is related to a handover of a wireless device from the source IAB-node to a target IAB-node. The CP of the IAB-donor CU transmits a SN Status Transfer message to another IAB-donor which serves the target IAB-node, based on the delivery status of the uplink data.

The present disclosure may have various advantageous effects.

According to some embodiments of the present disclosure, lossless uplink data transmission of IAB network in a wireless communication system will be provided.

For example, a source IAB-donor CU could know whether uplink data to be transmitted from the migrating IAB-node MT or the UE is remained or not.

For example, a CU of an IAB-donor may recognize a part of uplink data are remained on a DU of an IAB-node between a wireless device and the CU of the IAB-donor, during handover procedure of the wireless device, in multi-hop wireless backhaul system.

For example, it is possible to perform inter-donor CU handover involving parent IAB-node change without loss of uplink data received from the migrating IAB-node MT or the UE.

For example, methods described herein could make the experience of the wireless device better (e.g. smooth and seamless IAB-node DU change or handover).

For example, the methods described herein could also facilitate the RAN node to handle the data packets better for a specific wireless device during the IAB-node DU change or the handover.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Figure 1:
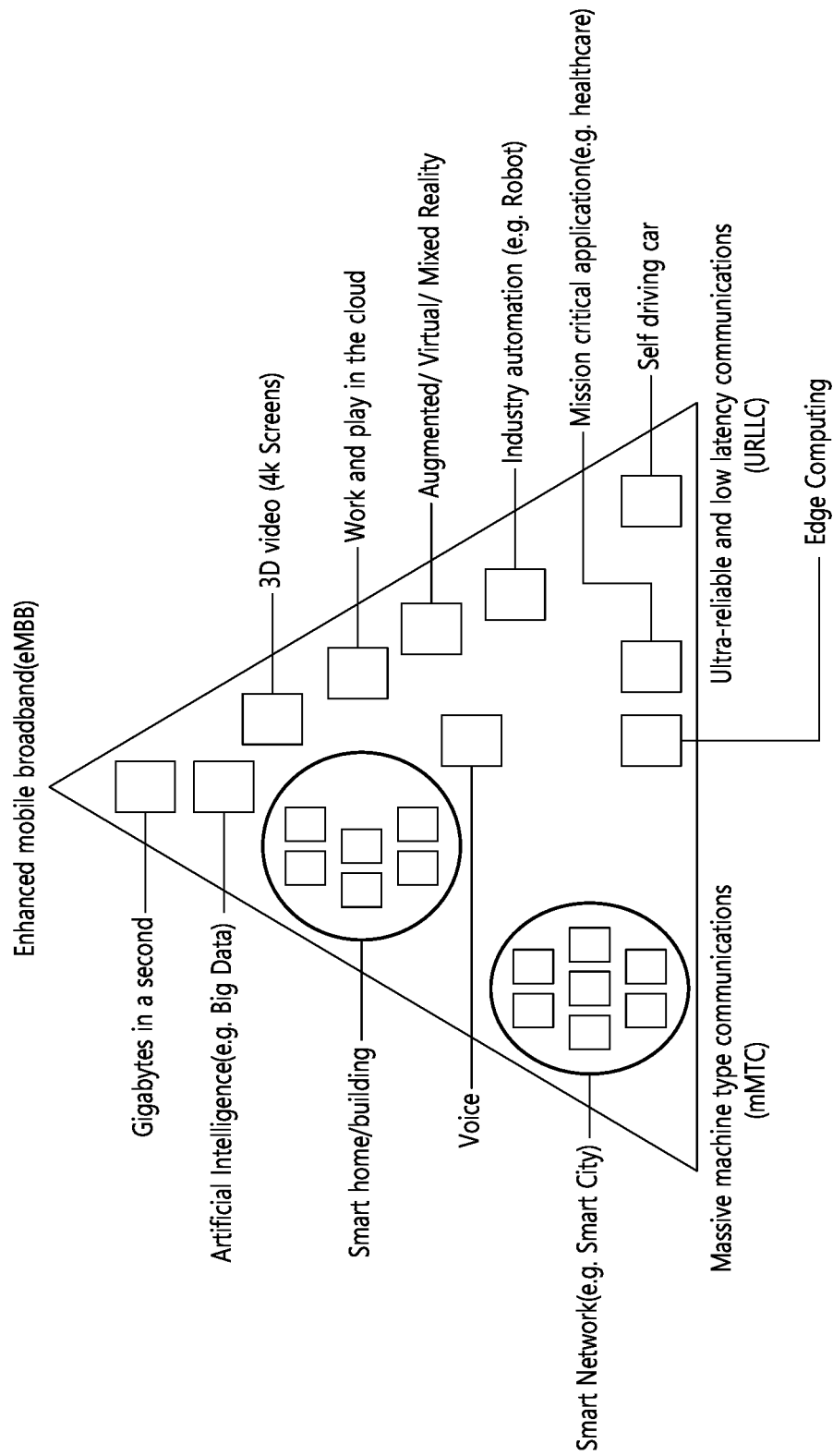
FIG. 1 shows examples of 5G usage scenarios to which the technical features of the present disclosure can be applied.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
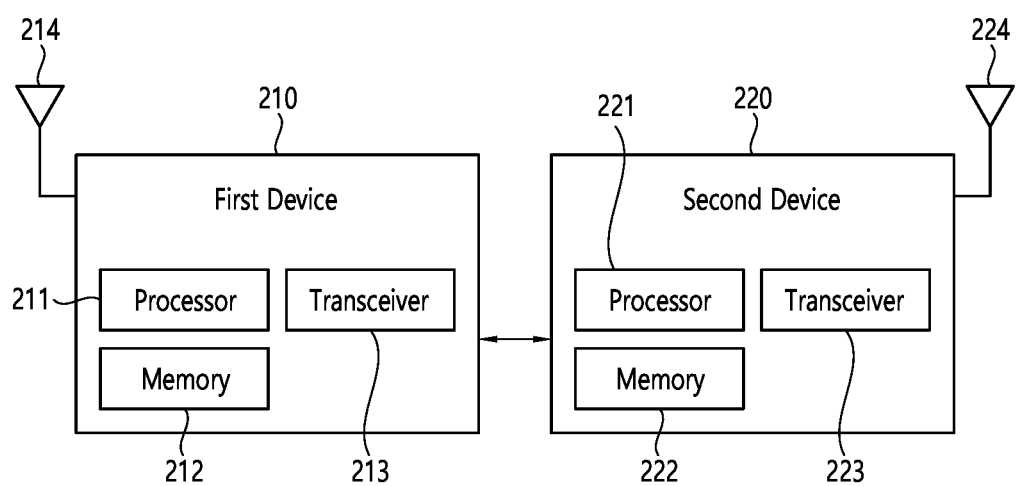
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220. The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
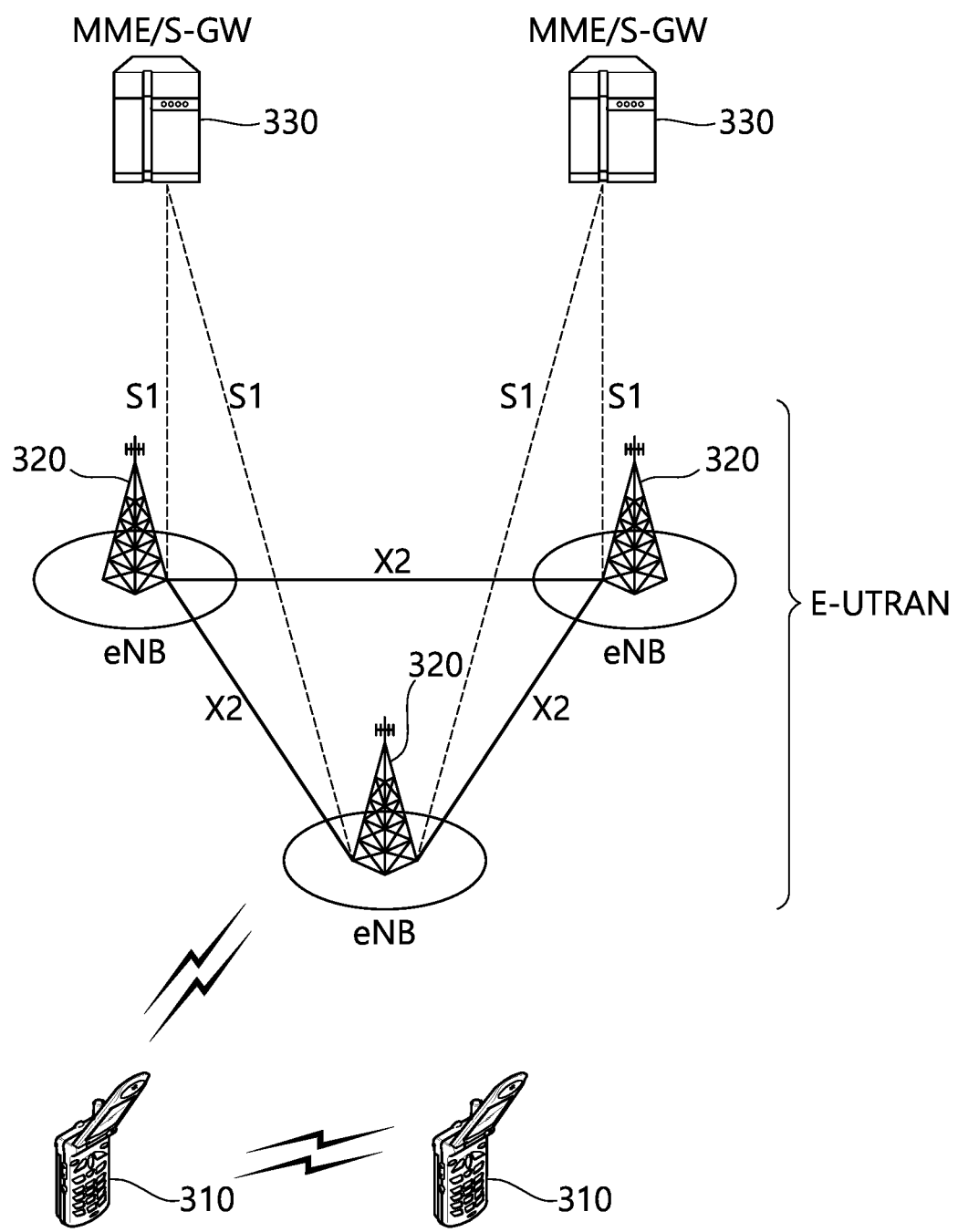
FIG. 3 shows another example of a wireless communication system to which the technical features of the present disclosure can be applied.

FIG. 3 shows another example of a wireless communication system to which the technical features of the present disclosure can be applied. Specifically, FIG. 3 shows a system architecture based on an evolved-UMTS terrestrial radio access network (E-UTRAN). The aforementioned LTE is a part of an evolved-UMTS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
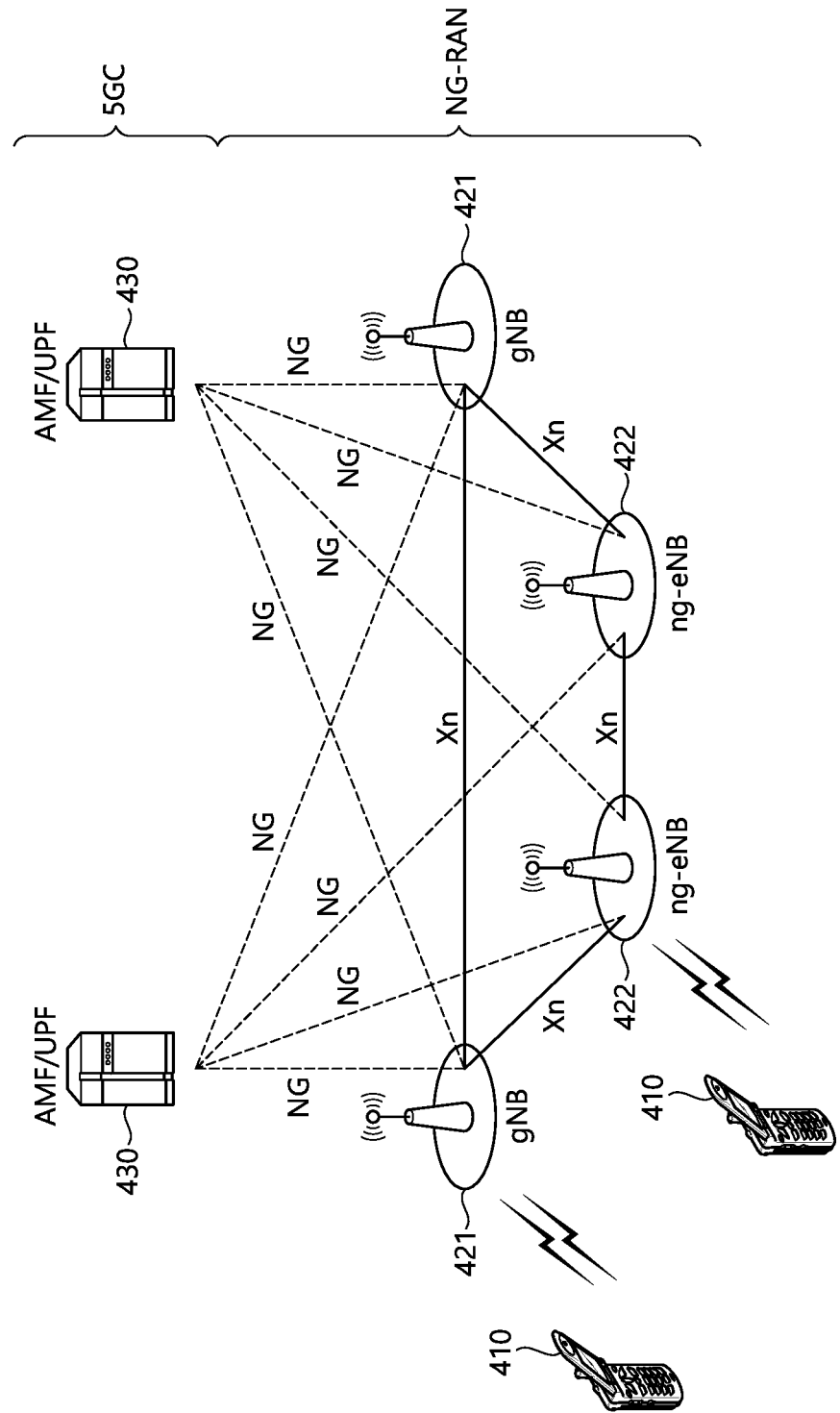
FIG. 4 shows another example of a wireless communication system to which the technical features of the present disclosure can be applied.

FIG. 4 shows another example of a wireless communication system to which the technical features of the present disclosure can be applied. Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
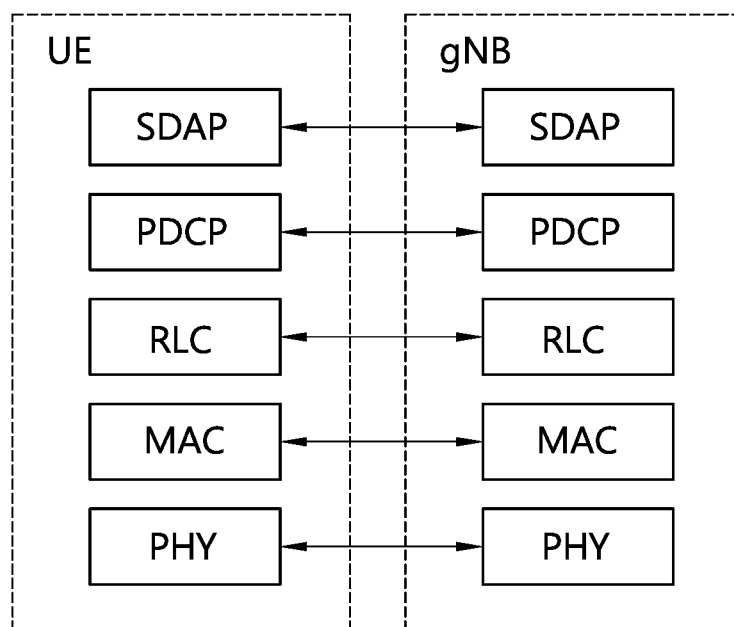
FIG. 5 shows a block diagram of a user plane protocol stack to which the technical features of the present disclosure can be applied.
Figure 6:
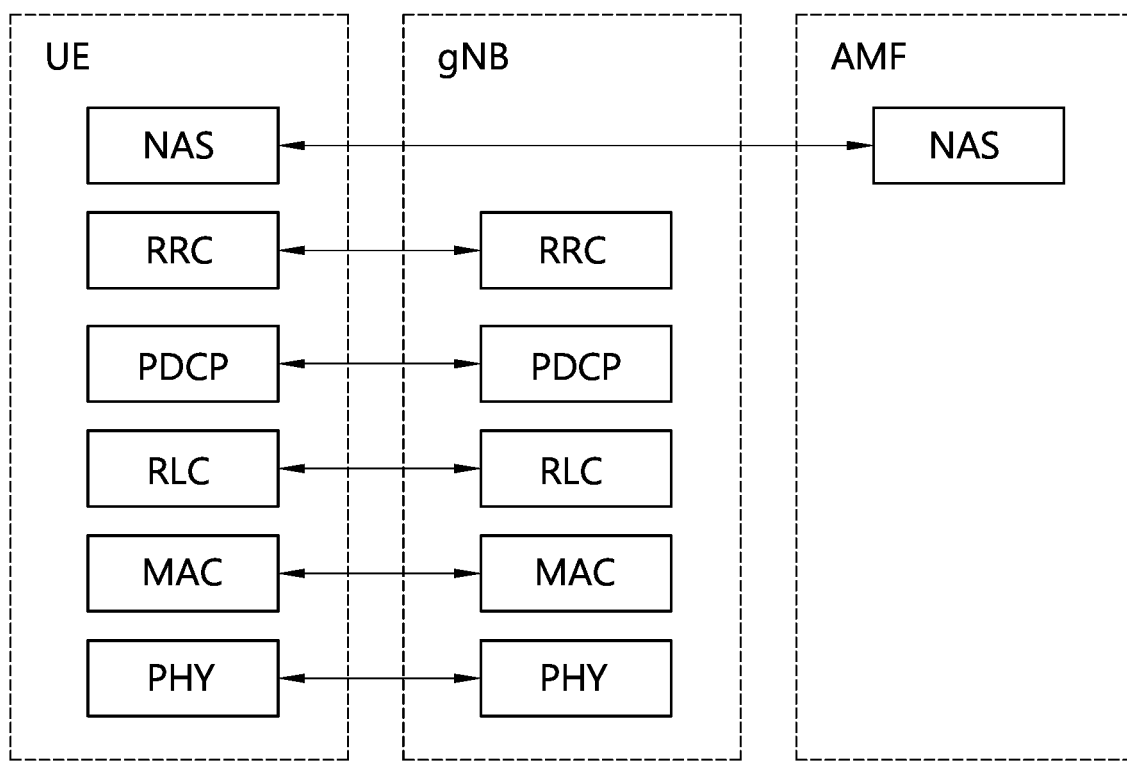
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied. The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Split of gNB central unit (gNB-CU) and gNB distributed unit (gNB-DU) is described. Section 6 of 3GPP TS 38.401 V15.4.0 (2018 December) and Sections 5.2 and 7.1 of 3GPP TS 38.470 V15.4.0 (2018 December) may be referred.

Figure 7:
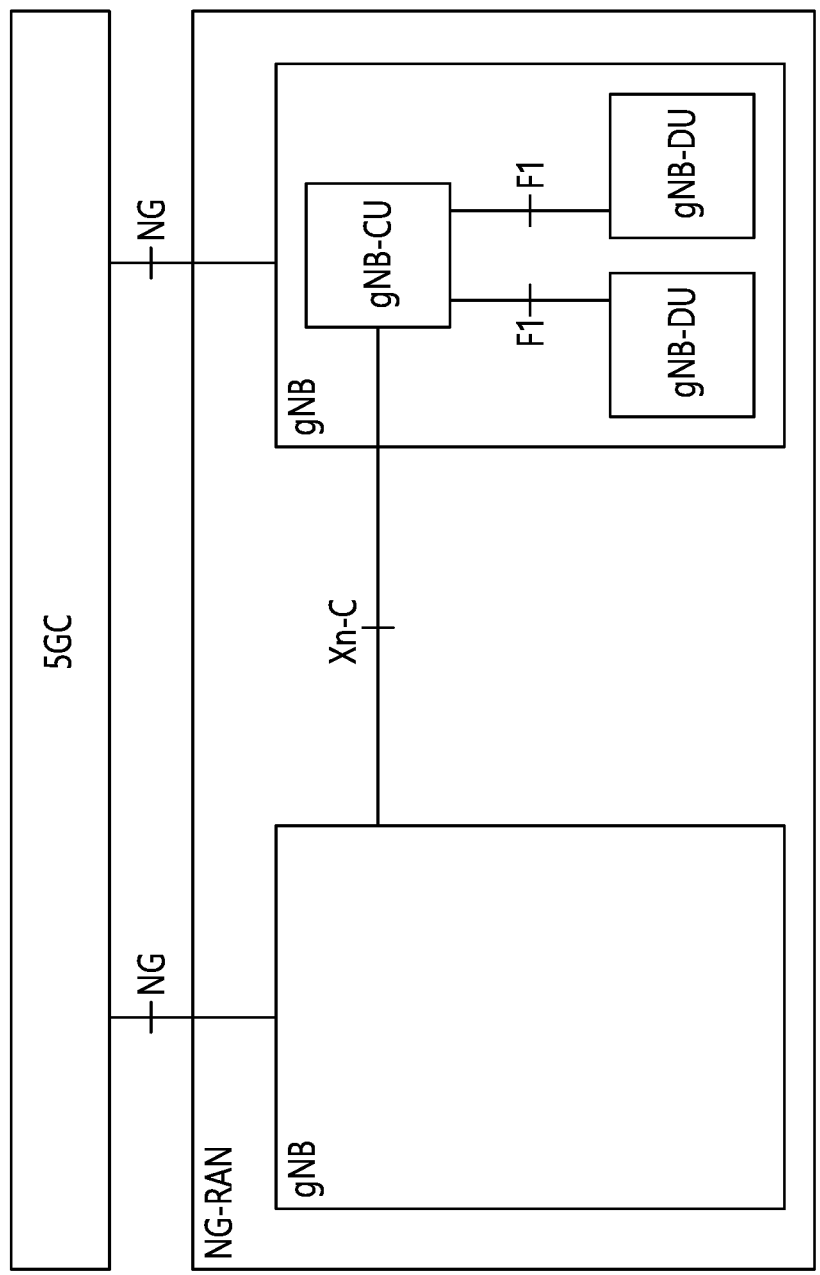
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
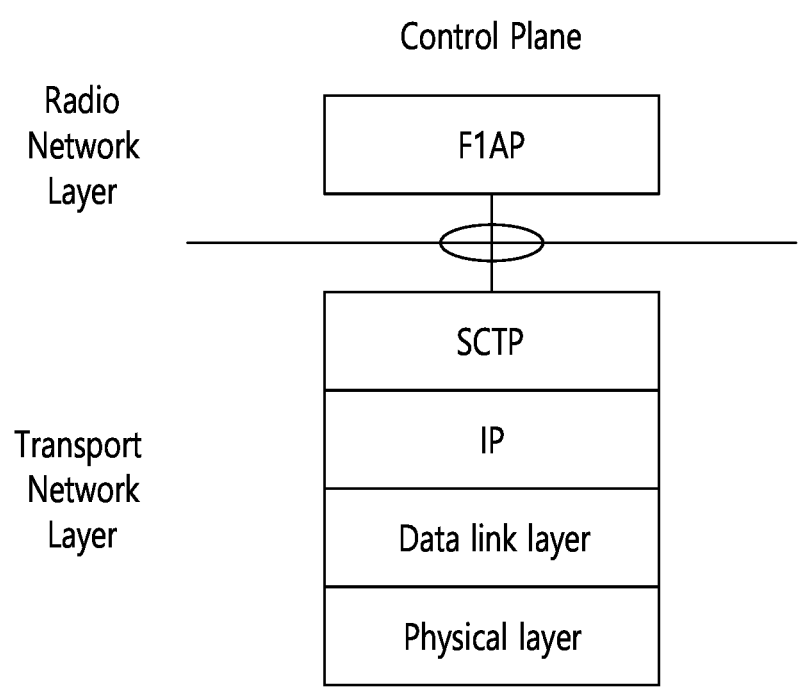
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Integrated access and backhaul (IAB) is described. Section 6 of 3GPP TR 38.874 V16.0.0 (2018 December) can be referred.

IAB-node is a node that provides functionality to support connectivity to the network for the UE via an NR backhaul. IAB-node is a RAN node that supports wireless access to UEs and wirelessly backhauls the access traffic. IAB-donor (or IAB-donor gNB) is a gNB that provides functionality to support an NR backhaul for IAB-nodes. IAB-donor is a RAN node which provides UE's interface to core network and wireless backhauling functionality to IAB-nodes. The IAB-donor and IAB-node(s) may have the relation of gNB-CU and gNB-DU. IAB-donor-CU is the gNB-CU of an IAB-donor gNB, terminating the F1 interface towards IAB-nodes and IAB-donor-DU. IAB-donor-DU is the gNB-DU of an IAB-donor gNB, hosting the IAB backhaul adaptation protocol (BAP) layer, providing wireless backhaul to IAB-nodes. NR backhaul link is NR link used for backhauling between an IAB-node to an IAB-donor, and between IAB-nodes in case of a multi-hop network. The NR backhaul link may be called other names, such as backhaul (BH) RLC channel.

IAB strives to reuse existing functions and interfaces defined for access. In particular, mobile-termination (MT), gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined a component of the mobile equipment. MT is referred to as a function residing on an IAB-node that terminates the radio interface layers of the backhaul Uu interface toward the IAB-donor or other IAB-nodes.

Figure 9:
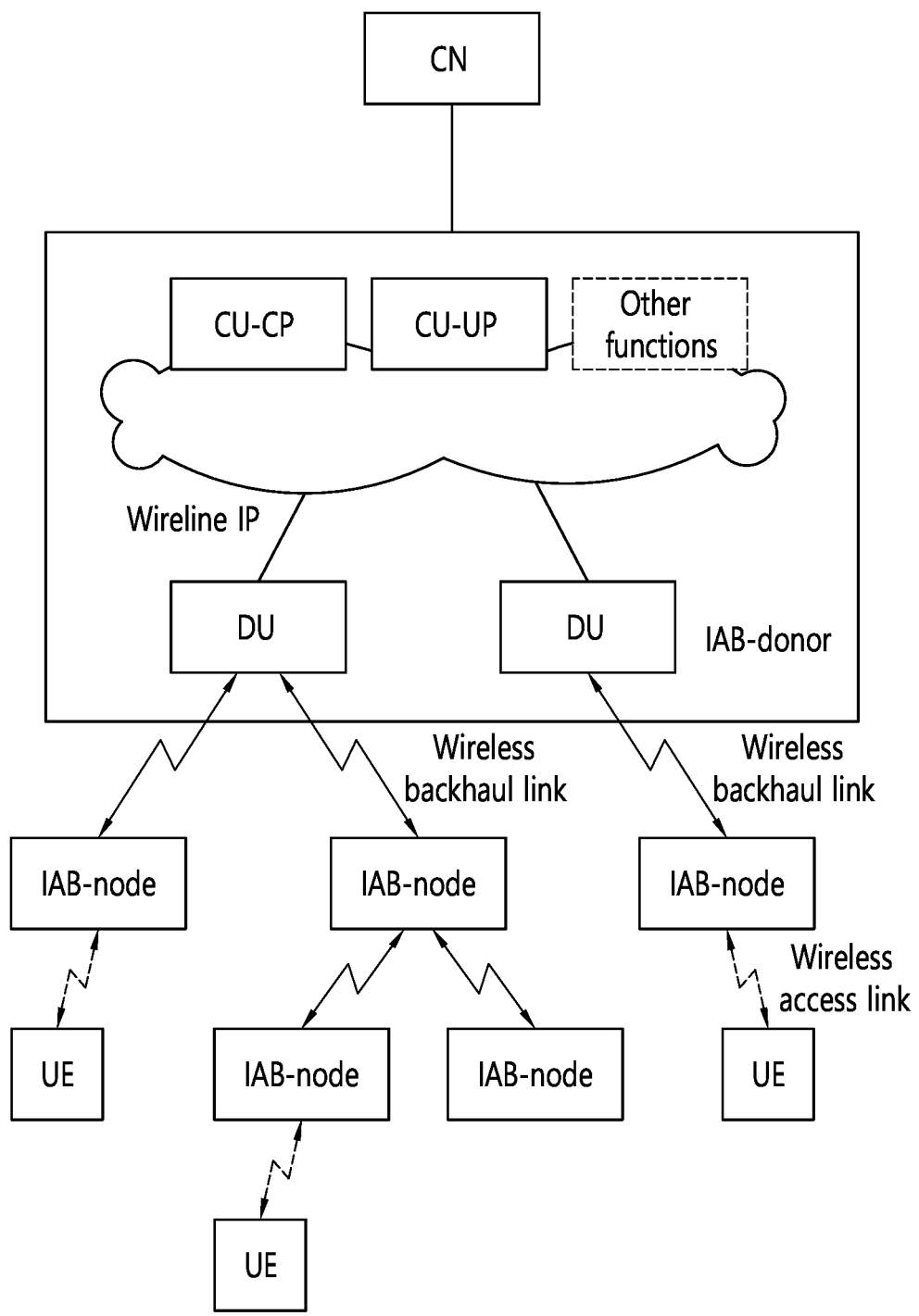
FIG. 9 shows a reference diagram for IAB in standalone mode, which contains one IAB-donor and multiple IAB-nodes, to which the technical features of the present disclosure can be applied.

FIG. 9 shows a reference diagram for IAB in standalone mode, which contains one IAB-donor and multiple IAB-nodes, to which the technical features of the present disclosure can be applied.

The IAB-donor is treated as a single logical node that comprises a set of functions such as gNB-DU, gNB-CU control plane (gNB-CU-CP), gNB-CU user plane (gNB-CU-UP) and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

Figure 10:
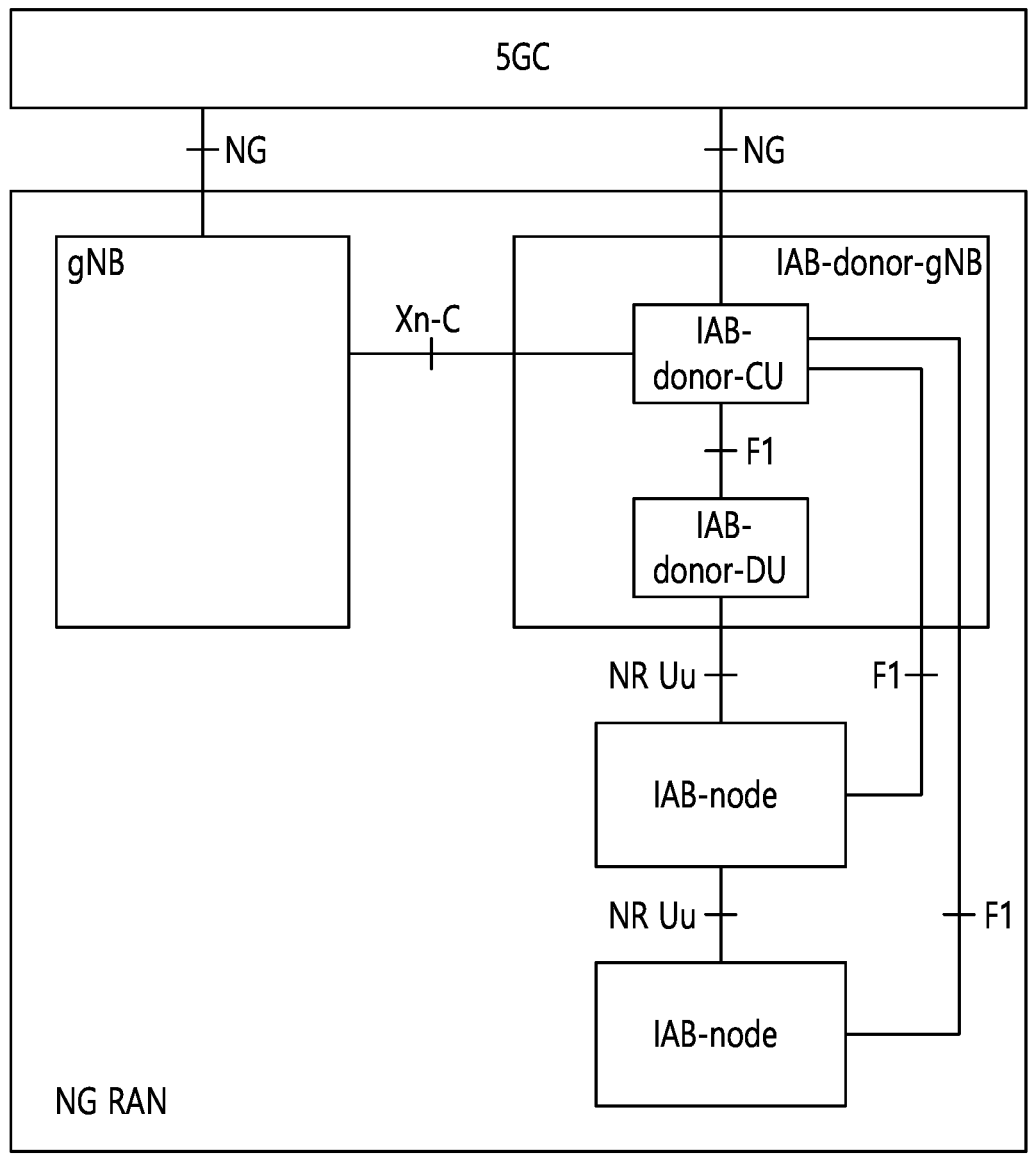
FIG. 10 shows an example of overall architecture of IAB to which the technical features of the present disclosure can be applied.

FIG. 10 shows an example of overall architecture of IAB to which the technical features of the present disclosure can be applied.

The NG-RAN supports IAB by the IAB-node wirelessly connecting to the gNB capable of serving the IAB-nodes, named IAB-donor gNB.

The IAB-donor gNB consists of an IAB-donor-CU and one or more IAB-donor-DU(s). In case of separation of gNB-CU-CP and gNB-CU-UP, the IAB-donor gNB may consist of an IAB-donor-CU-CP, multiple IAB-donor-CU-UPs and multiple IAB-donor-DUs.

The IAB-node connects to an upstream IAB-node or an IAB-donor-DU via a subset of the UE functionalities of the NR Uu interface (named IAB-MT function of IAB-node). The IAB-node provides wireless backhaul to the downstream IAB-nodes and UEs via the network functionalities of the NR Uu interface (named IAB-DU function of IAB-node).

The F1-C traffic towards an IAB-node is backhauled via the IAB-donor-DU and the optional intermediate IAB-node(s).

The F1 user plane interface (F1-U) traffic towards an IAB-node is backhauled via the IAB-donor-DU and the optional intermediate IAB-node(s).

All functions specified for a gNB-DU are equally applicable for an IAB-node and IAB-donor-DU unless otherwise stated, and all functions specified for a gNB-CU are equally applicable for an IAB-donor-CU, unless otherwise stated. All functions specified for the UE context are equally applicable for managing the context of IAB-node MT functionality, unless otherwise stated.

Figure 11:
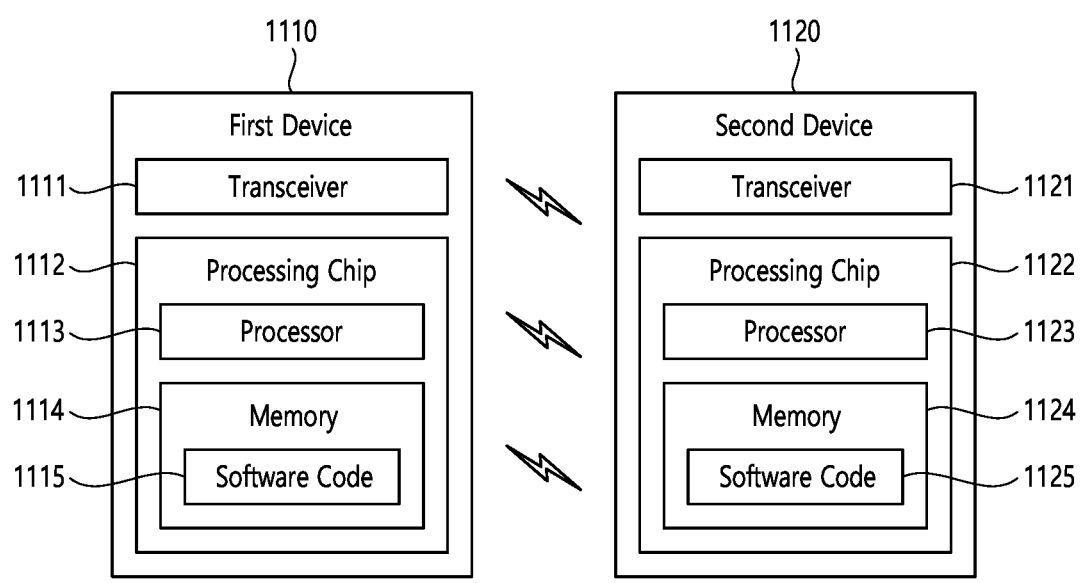
FIG. 11 shows another example of a wireless communication system to which the technical features of the present disclosure can be applied.

FIG. 11 shows another example of a wireless communication system to which the technical features of the present disclosure can be applied.

Referring to FIG. 11, the wireless communication system may include a first device 1110 and a second device 1120.

The first device 1110 may include at least one transceiver, such as a transceiver 1111, and at least one processing chip, such as a processing chip 1112. The processing chip 1112 may include at least one processor, such a processor 1113, and at least one memory, such as a memory 1114. The memory may be operably connectable to the processor 1113. The memory 1114 may store various types of information and/or instructions. The memory 1114 may store a software code 1115 which implements instructions that, when executed by the processor 1113, perform operations of the present disclosure described below. For example, the software code 1115 may implement instructions that, when executed by the processor 1113, perform the functions, procedures, and/or methods of the present disclosure described below. For example, the software code 1115 may control the processor 1113 to perform one or more protocols. For example, the software code 1115 may control the processor 1113 may perform one or more layers of the radio interface protocol.

The second device 1120 may include at least one transceiver, such as a transceiver 1121, and at least one processing chip, such as a processing chip 1122. The processing chip 1122 may include at least one processor, such a processor 1123, and at least one memory, such as a memory 1124. The memory may be operably connectable to the processor 1123. The memory 1124 may store various types of information and/or instructions. The memory 1124 may store a software code 1125 which implements instructions that, when executed by the processor 1123, perform operations of the present disclosure described below. For example, the software code 1125 may implement instructions that, when executed by the processor 1123, perform the functions, procedures, and/or methods of the present disclosure described below. For example, the software code 1125 may control the processor 1123 to perform one or more protocols. For example, the software code 1125 may control the processor 1123 may perform one or more layers of the radio interface protocol.

According to some embodiment of the present disclosure, the technical features of the present disclosure could be embodied directly in hardware, in a software executed by a processor, or in a combination of the two. For example, a method performed by a first core network node in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

Figure 12:
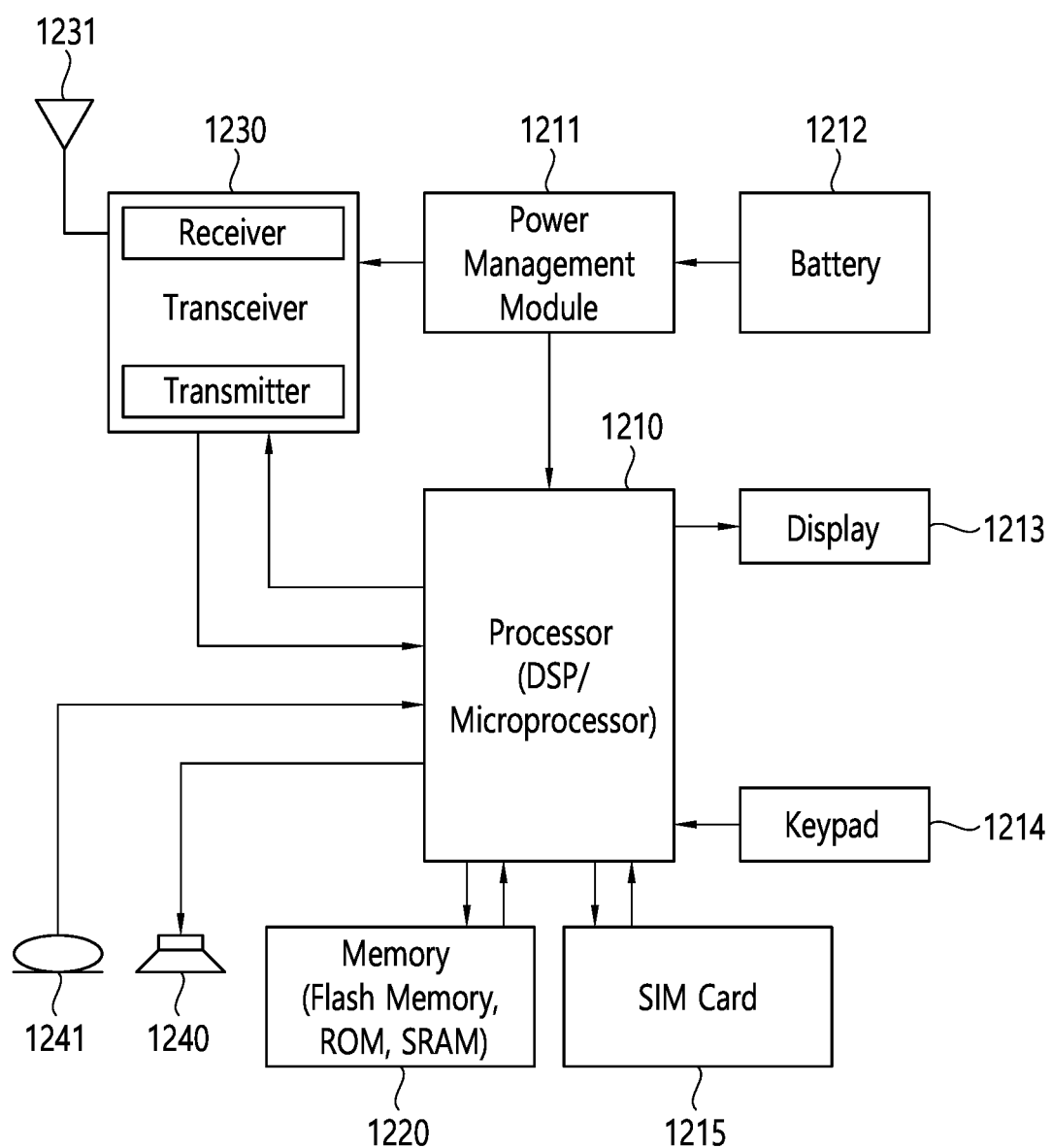
FIG. 12 shows an apparatus to which the technical features of the present disclosure can be applied.

FIG. 12 shows an apparatus to which the technical features of the present disclosure can be applied. The detailed description of the same features as those described above will be simplified or omitted.

An apparatus may be referred to as a wireless device, such as a user equipment (UE), an Integrated Access and Backhaul (IAB), or etc.

A wireless device includes a processor 1210, a power management module 1211, a battery 1212, a display 1213, a keypad 1214, a subscriber identification module (SIM) card 1215, a memory 1220, a transceiver 1230, one or more antennas 1231, a speaker 1240, and a microphone 1241.

The processor 1210 may be configured to implement proposed functions, procedures and/or methods described in this description. Layers of the radio interface protocol may be implemented in the processor 1210. The processor 1210 may include application-specific integrated circuit (ASIC), other chipset, logic circuit and/or data processing device. The processor 1210 may be an application processor (AP). The processor 1210 may include at least one of a digital signal processor (DSP), a central processing unit (CPU), a graphics processing unit (GPU), a modem (modulator and demodulator). An example of the processor 1210 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1211 manages power for the processor 1210 and/or the transceiver 1230. The battery 1212 supplies power to the power management module 1211. The display 1213 outputs results processed by the processor 1210. The keypad 1214 receives inputs to be used by the processor 1210. The keypad 1214 may be shown on the display 1213. The SIM card 1215 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1220 is operatively coupled with the processor 1210 and stores a variety of information to operate the processor 1210. The memory 1220 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1220 and executed by the processor 1210. The memory 1220 can be implemented within the processor 1210 or external to the processor 1210 in which case those can be communicatively coupled to the processor 1210 via various means as is known in the art.

The transceiver 1230 is operatively coupled with the processor 1210, and transmits and/or receives a radio signal. The transceiver 1230 includes a transmitter and a receiver. The transceiver 1230 may include baseband circuitry to process radio frequency signals. The transceiver 1230 controls the one or more antennas 1231 to transmit and/or receive a radio signal.

The speaker 1240 outputs sound-related results processed by the processor 1210. The microphone 1241 receives sound-related inputs to be used by the processor 1210.

Figure 13:
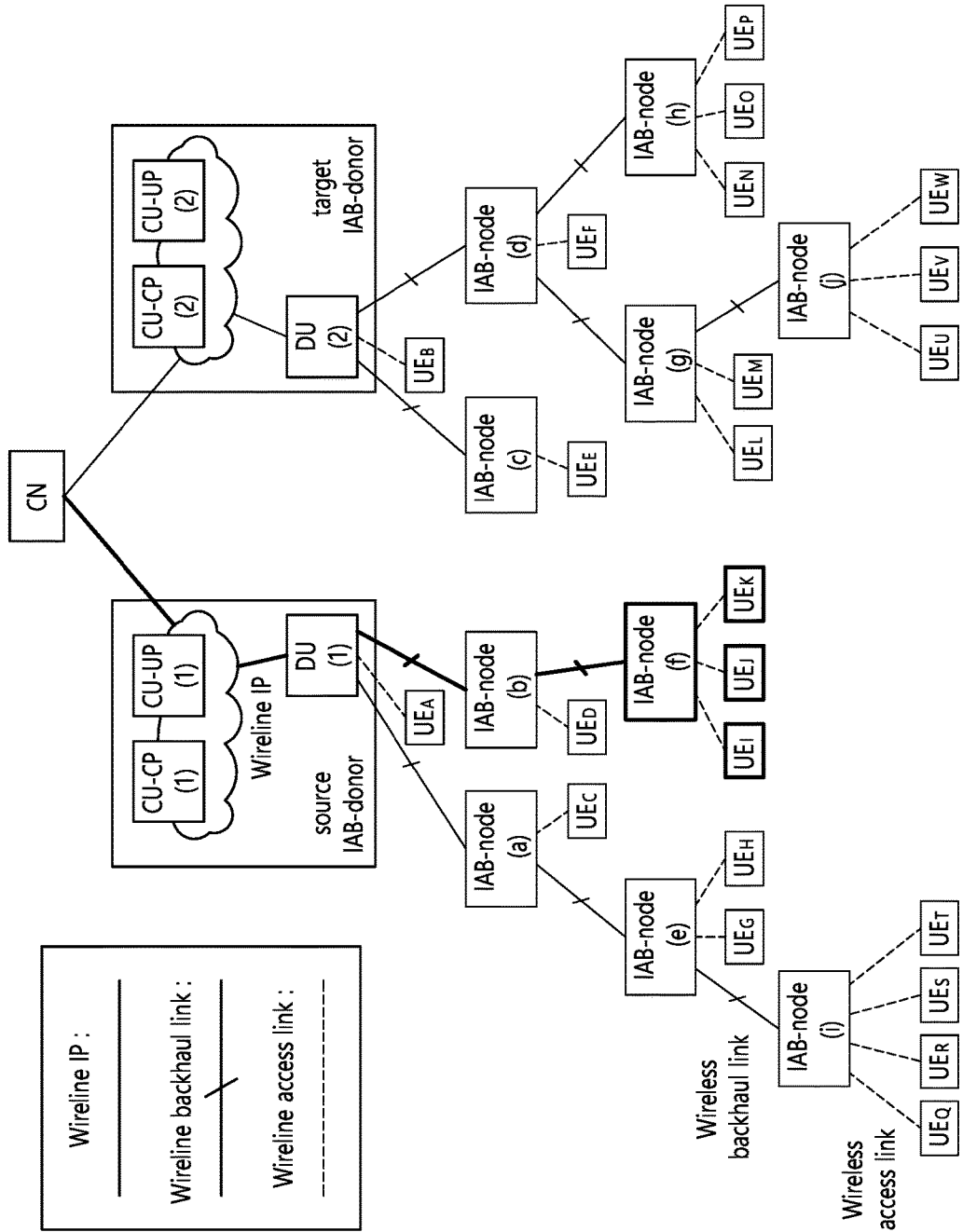
FIGS. 13 and 14 show an example of a handover process of a wireless device in a multi-hop wireless backhaul system to which the technical features of the present disclosure can be applied.
Figure 14:
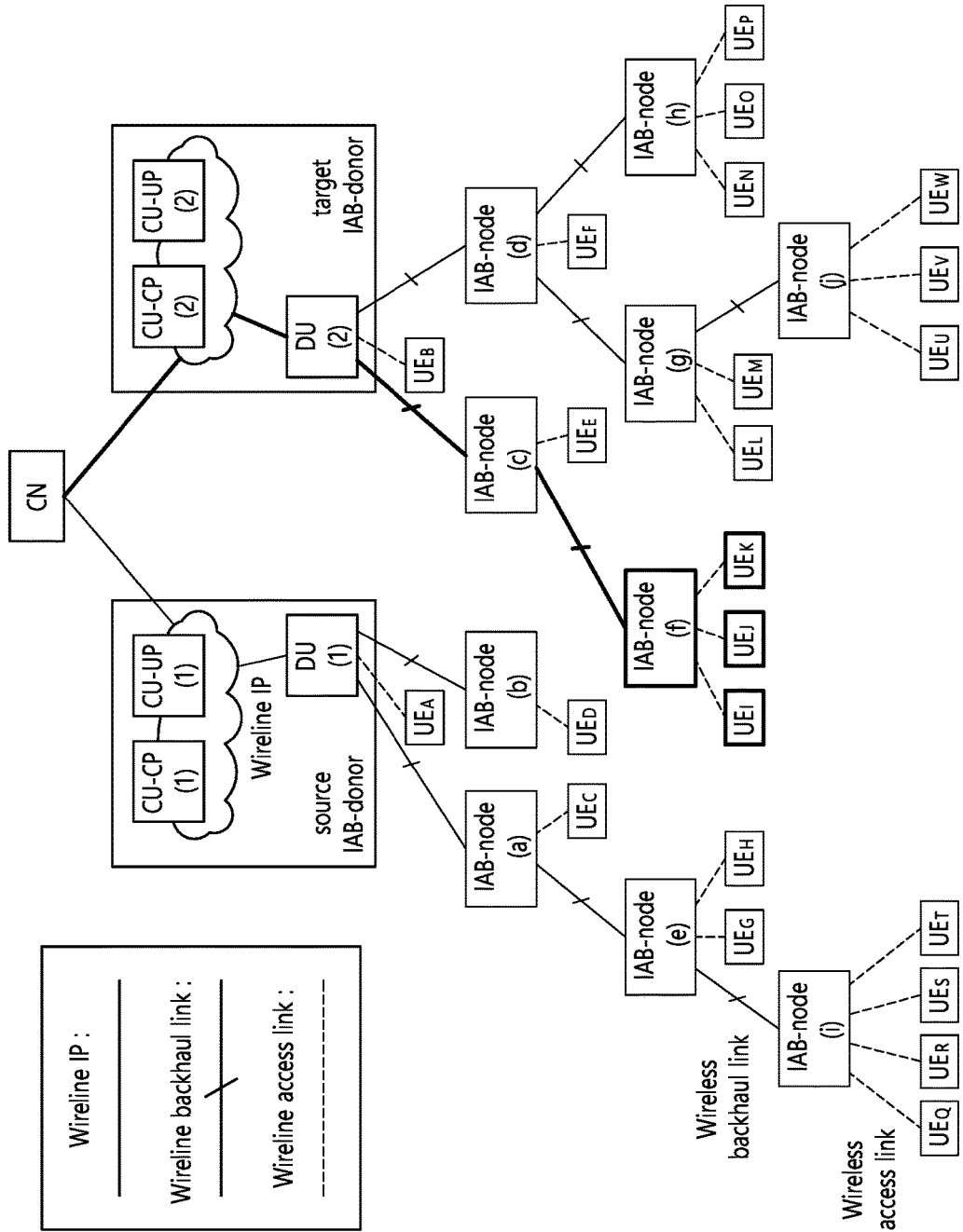

FIGS. 13 and 14 show an example of a handover process of a wireless device in a multi-hop wireless backhaul system to which the technical features of the present disclosure can be applied.

Referring to FIGS. 13 and 14, a UE may be connected with an IAB-node or an IAB-donor via wireless access link. For example, the $UE_A$ and the $UE_B$ are connected with the DU (1) of the source IAB-donor and the DU (2) of the target IAB-donor, respectively. The $UE_C$, the $UE_D$, the $UE_E$, and the $UE_F$ are connected with the IAB-node (a), the IAB-node (b), the IAB-node (c), and the IAB-node (d), respectively. The $UE_G$ and the $UE_H$ are connected with the IAB-node (e). The $UE_I$, the $UE_J$ and the $UE_K$ are connected with the IAB-node (f). The $UE_L$ and the $UE_M$ are connected with the IAB-node (g). The $UE_N$, the $UE_O$, and the $UE_P$ are connected with the IAB-node (h). The $UE_Q$, the $UE_R$, the $UE_S$, and the $UE_T$ are connected with the IAB-node (i). The $UE_U$, the $UE_V$, and the $UE_W$ are connected with the IAB-node (j).

An IAB-node may be connected with other IAB-node or an IAB-donor via wireless backhaul link. For example, the IAB-node (a) and the IAB-node (b) are connected with the DU (1) of the source IAB-donor. The IAB-node (c) and the IAB-node (d) are connected with the DU (2) of the target IAB-donor. The IAB-node (e), the IAB-node (f), the IAB-node (g), and the IAB-node (h) are connected with the IAB-node (a), the IAB-node (b), and the IAB-node (d), respectively. The IAB-node (i) and the IAB-node (j) are connected with the IAB-node (e) and the IAB-node (g), respectively.

An IAB-donor may include a central unit (CU) and a distributed unit (DU). For example, the source IAB-donor includes the CU-user plane (UP) (1), the CU-control plane (CP) (1), and the DU (1). The target IAB-donor includes the CU-UP (2), the CU-CP (2), and the DU (2). The DU (1) of the source IAB-donor may be connected with the CU (1) of the IAB-donor via wireline internet protocol (IP). The DU (2) of the target IAB-donor may be connected with the CU (2) of the IAB-donor via wireline IP. An IAB-donor may be connected with a core network (CN) via wired line. For example, the source IAB-donor and the target IAB-donor are connected with the CN.

In FIGS. 13 and 14, a wireless device (i.e. the IAB-node (f)) may hand over from the IAB-node (b) connected with the source IAB-donor to the IAB-node (c) connected with the target IAB-donor. More specifically, a parent IAB-node for the IAB-node (f) may be changed from the IAB-node (b) to the IAB-node (c). The IAB-node (b) and the IAB-node (c) may be connected to different IAB-donor, such as the source IAB-donor and the target IAB-donor.

For Xn based handover, the source gNB may send a SN Status Transfer message to the target gNB based on downlink/uplink data which the source gNB has currently. Though the CU-DU split is applied to these gNBs, there is no problem since source gNB-CU has the forwarded downlink/uplink data.

However, in above case, a part of uplink data which IAB-node (f) transmits may not arrive yet to the source IAB-donor CU (for example, CU-UP (1) of the source IAB-donor) because of multi-hop wireless backhaul. If the source IAB-donor CU (for example, CU-CP (1) of the source IAB-donor) sends a SN Status Transfer message to the target IAB-donor CU (for example, CU-CP (2) of the target IAB-donor) without receiving all of uplink data which source IAB-node DU (1) transmits, the loss for uplink data could be happen.

Therefore, studies for lossless uplink data transmission of IAB network in a wireless communication system.

Hereinafter, a method for lossless uplink data transmission of IAB network during a handover procedure of a wireless device in a wireless communication system, according to some embodiments of the present disclosure, will be described with reference to following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 15:
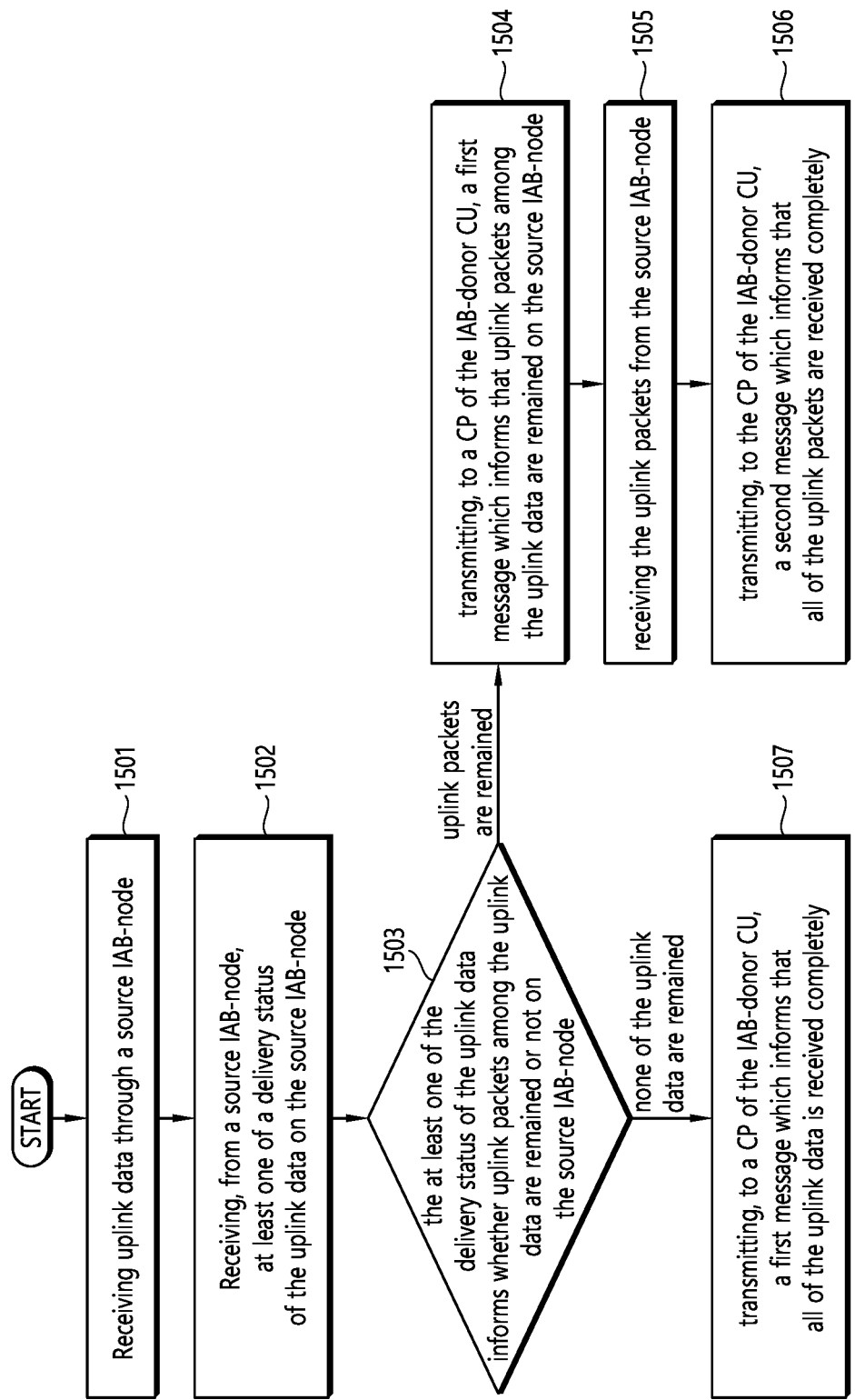
FIG. 15 shows an example of a method for lossless uplink data transmission of IAB network in a wireless communication system.

FIG. 15 shows an example of a method for lossless uplink data transmission of IAB network in a wireless communication system. In particular, FIG. 15 shows an example of a method performed by a user plane (UP) of an integrated access and backhaul (IAB)-donor central unit (CU) during a handover of a wireless device from a source IAB-node to a target IAB-node. In FIG. 15, a wireless device may perform a handover process from a source IAB-node DU to a target IAB-node DU. Herein, for convenience of the explanation, the source IAB-node DU and the target IAB-node DU may be referred to as a source IAB-node and a target IAB-node.

In step 1501, the UP of the IAB-donor CU may receive, from a wireless device, uplink data through a source IAB-node. The wireless device may be connected with a source IAB-node via wireless backhaul link or wireless access link. The source IAB-node may be connected with a DU of the IAB-donor via wireless backhaul link, and the DU of the IAB-donor may be connected with a control plane (CP) of the IAB-donor CU and the UP of the IAB-donor CU via wired line.

In step 1502, the UP of the IAB-donor CU may receive, from the source IAB-node, at least one of a delivery status of the uplink data on the source IAB-node.

For example, the UP of the IAB-donor CU may receive at least one of Downlink Data Delivery Status (DDDS). The DDDS could be transmitted to the UP of the IAB-donor CU more than once. The DDDS may be transmitted periodically.

In step 1503, the at least one of the delivery status of the uplink data, received in step 1502, may inform whether uplink packets among the uplink data are remained or not on the source IAB-node. The at least one of the delivery status of the uplink data may inform whether all of the uplink data to are transmitted completely or not.

For example, when at least one of the delivery status of the uplink data includes a Remaining UL Data indication, the UP of the IAB-donor may be informed that uplink packets among the uplink data are remained on the source IAB-node. Otherwise, when at least one of the delivery status of the uplink data includes a No UL Data indication, the UP of the IAB-donor may be informed that none of the uplink data are remained on the source IAB-node.

According to some embodiments of the present disclosure, only one of the Remaining UL Data indication and the No UL Data indication could be used.

For example, when at least one of the delivery status of the uplink data includes the Remaining UL Data indication, the UP of the IAB-donor may be informed that uplink packets among the uplink data are remained on the source IAB-node. Otherwise, when none of the delivery status of the uplink data includes the Remaining UL Data indication, the UP of the IAB-donor may be informed that none of the uplink data are remained on the source IAB-node.

For other example, when at least one of the delivery status of the uplink data includes the No UL Data indication, the UP of the IAB-donor may be informed that none of the uplink data are remained on the source IAB-node. Otherwise, when none of the delivery status of the uplink data includes the No UL Data indication, the UP of the IAB-donor may be informed that uplink packets among the uplink data are remained on the source IAB-node.

Referring to step 1503, if the at least one of the delivery status of the uplink data informs that uplink packets among the uplink data are remained on the source IAB-node, steps 1504 to 1506 will be followed.

In step 1504, the UP of the IAB-donor CU may transmit, to a CP of the IAB-donor CU, a first message which informs that uplink packets among the uplink data are remained on the source IAB-node. For example, the first message may include a UL Data Incomplete Indication which informs that the uplink packets among the uplink data are remained on the source IAB-node.

In other words, the first message may inform that the UP of the IAB-donor CU is still receives the uplink data from the wireless device. The first message may be transmitted to the CP of the IAB-donor CU in order to suspend to transmit a SN Status Transfer message to another IAB-donor, which serves the target IAB-node.

For example, the first message may be a Bearer Context Modification Response message. In particular, the UP of the IAB-donor CU transmit the Bearer Context Modification Response message including the UL Data Incomplete Indication in response to a Bearer Context Modification Request message received before. The Bearer Context Modification Request message may be transmitted based on the handover procedure of the wireless device.

In step 1505, the UP of the IAB-donor CU may receive the uplink packets among the uplink data from the source IAB-node. For example, the UP of the IAB-donor CU may receive the uplink packets indicated by the delivery status of the uplink data, received from step 1502.

In step 1506, the UP of the IAB-donor CU may transmit, to the CP of the IAB-donor CU, a second message which informs that all of the uplink packets are received completely.

For example, the UP of the IAB-donor CU may transmit a UL Data Complete message or a UL Data Complete indication. The UL Data Complete message may be an existing message or a new message. The UL Data Complete indication may be included in an existing message or a new message.

Referring to step 1503, if the at least one of the delivery status of the uplink data informs that none of the uplink data are remained on the source IAB-node, step 1507 will be followed.

In step 1507, the UP of the IAB-donor CU may transmit, to the CP of the IAB-donor CU, a first message which informs that all of the uplink packets are received completely.

For example, the UP of the IAB-donor CU may transmit a UL Data Complete message or a UL Data Complete indication. The UL Data Complete message may be an existing message or a new message. The UL Data Complete indication may be included in an existing message or a new message.

For example, the first message may be a Bearer Context Modification Response message. In particular, the UP of the IAB-donor CU transmit the Bearer Context Modification Response message including the UL Data complete Indication in response to a Bearer Context Modification Request message received before. The Bearer Context Modification Request message may be transmitted based on that the wireless device handovers from the source IAB-node to a target IAB-node.

Figure 16A:
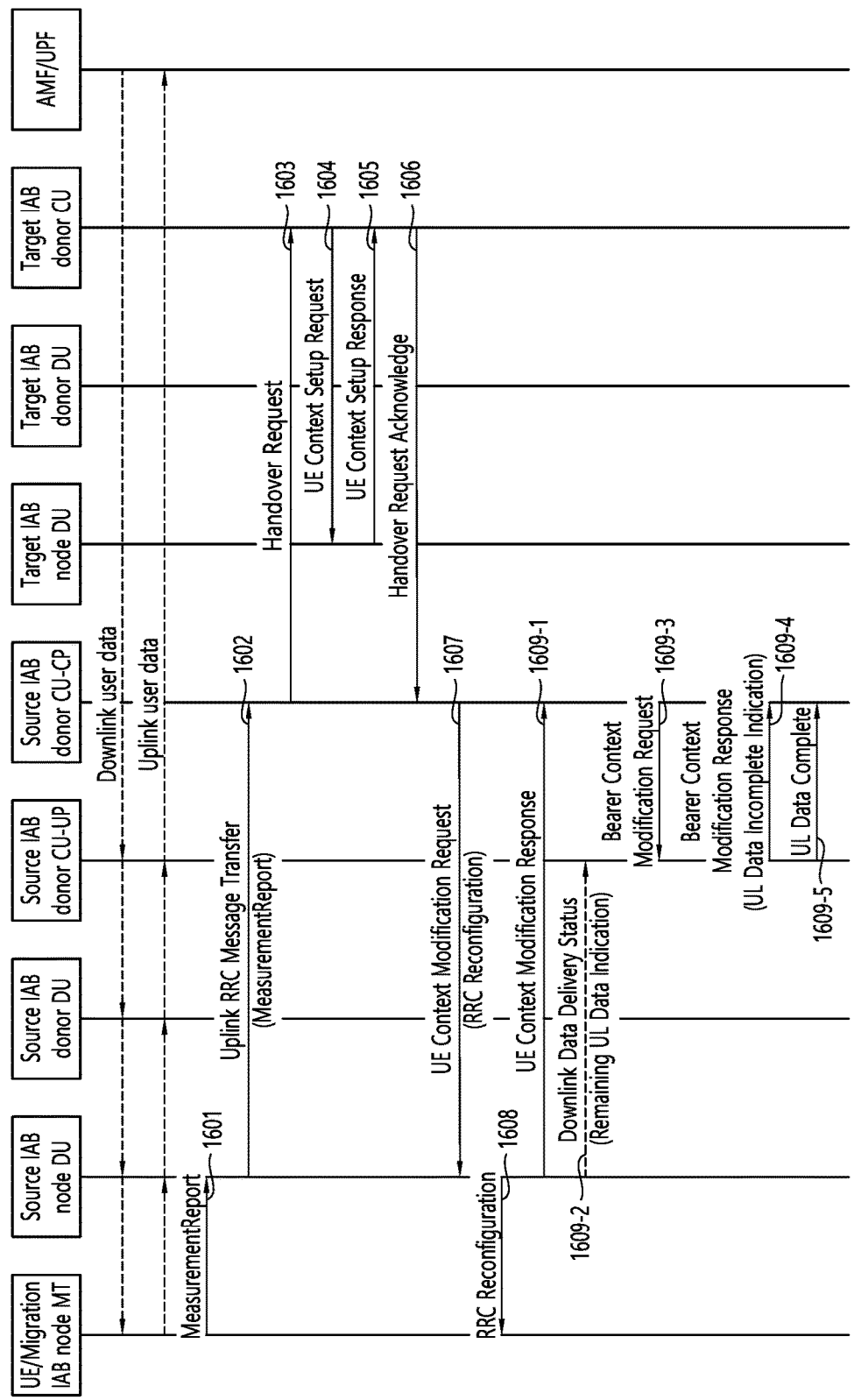
FIGS. 16A and 16B show a flow chart for an example of a method for lossless uplink data transmission of IAB network in a wireless communication system.
Figure 16B:
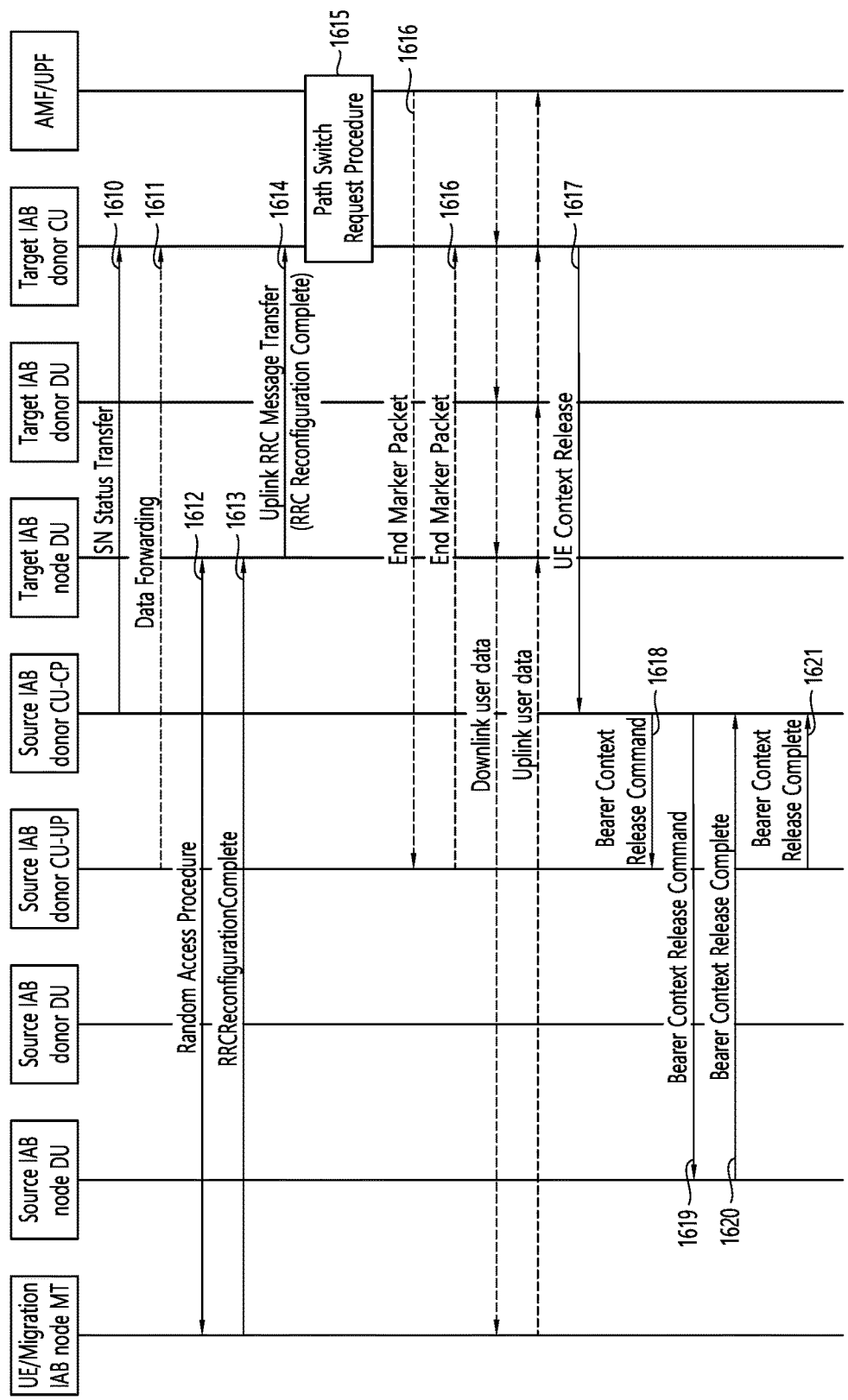

FIGS. 16A and 16B show a flow chart for an example of a method for lossless uplink data transmission of IAB network in a wireless communication system. In particular, FIGS. 16A and 16B show a method for lossless uplink data transmission performed by a CU-UP of an IAB-donor during inter-donor CU handover procedure involving parent IAB-node change.

In FIGS. 16A and 16B, a wireless device may be referred as a UE or a migrating IAB-node MT. A wireless device may receive downlink user data from the user plane function (UPF) through the source IAB-donor CU-UP, the source IAB-donor DU, and the source IAB-node DU. A wireless device may transmit uplink user data to the UPF through the source IAB-node DU, source IAB-donor DU, and the source IAB-donor CU-UP.

In step 1601, the migrating IAB-node MT or the UE may send a MeasurementReport message to the source IAB-node DU. This report may be based on a measurement configuration of the migrating IAB-node's MT or the UE. For example, the wireless device (for example, the migrating IAB-node's MT or the UE) may transmit the report message to the source IAB-donor CU-CP.

In step 1602, the source IAB-node DU may transmit an Uplink RRC Message Transfer message to the source IAB-donor CU-CP to convey the received MeasurementReport message.

In step 1603, the source IAB-donor CU-CP may send a XnAP Handover Request message to the target IAB-donor CU.

In step 1604, the target IAB-donor CU may transmit an UE Context Setup Request message to the target IAB-node DU to create an MT context or an UE context, and setup one or more bearers.

In step 1605, the target IAB-node DU may respond to the target IAB-donor CU with an UE Context Setup Response message.

In step 1606, the target IAB-donor CU may respond the source IAB-donor CU-CP with an XnAP Handover Request Acknowledge message.

In step 1607, the source IAB-donor CU-CP may send an UE Context Modification Request message to the source IAB-node DU. The UE Context Modification Request message may include a generated RRCReconfiguration message. The UE Context Modification Request message may indicate to stop the data transmission for the MT or the UE.

In step 1608, the source IAB-node DU may forward the received RRCReconfiguration message to the MT or the UE.

In this example, the signaling over F1-U may be used for lossless uplink data transmission.

In step 1609-1, the source IAB-node DU may respond to the source IAB-donor CU-CP with an UE Context Modification Response message.

In step 1609-2, the source IAB-node DU may transmit a Downlink Data Delivery Status or new message to the source IAB-donor CU-UP through F1-U interface.

The Downlink Data Delivery Status or the new message may include the Remaining UL Data Indication to notify the source IAB-donor CU-UP that there are uplink packets to be transmitted. In other words, the Remaining UL Data indication may inform that uplink packets among the uplink data, from the wireless device to the IAB-donor CU-UP, are remained on the source IAB-node DU.

The Downlink Data Delivery Status or the new message may include the uplink data related information (for example, UE ID, Bearer ID, PDCP sequence number of transmitted uplink packets, PDCP sequence number of uplink packets to be transmitted, RLC sequence number assigned by the UE/the IAB-node DU for transmitted uplink packets, and/or RLC sequence number assigned by the UE/the IAB-node DU for uplink packets to be transmitted).

The Downlink Data Delivery Status or the new message may include a No UL Data Indication. The No UL Data Indication may inform that the source IAB-node DU does not have uplink packet to be transmitted.

For example, the Downlink Data Delivery Status or the new message may include one of the Remaining UL Data Indication or the No UL Data Indication.

For other example, the Downlink Data Delivery Status or the new message may include the Remaining UL Data Indication or not. The Downlink Data Delivery Status or the new message without the Remaining UL Data Indication may inform that that the source IAB-node DU does not have uplink packet to be transmitted.

For another example, the Downlink Data Delivery Status or the new message may include the No UL Data Indication or not. The Downlink Data Delivery Status or the new message without the No UL Data Indication may inform that that the source IAB-node DU has uplink packet to be transmitted.

In step 1609-3, in response to the UE Context Modification Response message from the source IAB-node DU, the source IAB-donor CU-CP may transmit a Bearer Context Modification Request message to the source IAB-donor CU-UP.

In step 1609-4, upon receiving the messages (for example, the Downlink Data Delivery Status or the new message from the source IAB-node DU and the Bearer Context Modification Request message from the source IAB-donor CU-CP), the source IAB-donor CU-UP may send to a Bearer Context Modification Response message including the UL Data Incomplete Indication in order not to transmit a SN Status Transfer message.

For example, if the source IAB-donor CU-UP receives, from the source IAB-node DU, the Downlink Data Delivery Status or the new message which informs that the source IAB-node DU has uplink packet to be transmitted (for example, the Downlink Data Delivery Status or the new message including the Remaining UL Data Indication), the source IAB-donor CU-UP may send to a Bearer Context Modification Response message including the UL Data Incomplete Indication.

For other example, if the source IAB-donor CU-UP receives, from the source IAB-node DU, the Downlink Data Delivery Status or the new message which informs that the source IAB-node DU does not have uplink packet to be transmitted (for example, the Downlink Data Delivery Status or the new message including the No UL Data Indication), the source IAB-donor CU-UP may send to a Bearer Context Modification Response message without the UL Data Incomplete Indication.

In step 1609-5, when the source IAB-donor CU-UP receives all of indicated uplink packets from the source IAB-node DU, the source IAB-donor CU-UP may transmit an UL Data Complete message or indication to the source IAB-donor CU-CP. The UL Data Complete message may be an existing or a new message. The UL Data Complete indication may be included in an existing or a new message.

The UL Data Complete message or indication may indicate that the source IAB-donor CU-UP completely receives all of indicated uplink packets.

Otherwise, when the source IAB-node DU does not have uplink packet to be transmitted, the source IAB-donor CU-UP may transmit an UL Data Complete indication to the source IAB-donor CU-CP. For example, when the source IAB-donor CU-UP receives, from the source IAB-node DU, the Downlink Data Delivery Status or the new message including the No UL Data Indication, the source IAB-donor CU-UP may transmit an UL Data Complete indication to the source IAB-donor CU-CP.

In step 1610, until receiving the message including the UL Data Complete message or indication from the source IAB-node DU, the source IAB-donor CU-CP may wait to proceeding the handover procedure. For example, after receiving the UL Data Complete message or indication, the source IAB-donor CU-CP may send a SN Status Transfer message to the target IAB-donor CU.

In step 1611, Data Forwarding may be performed from the source IAB-donor CU-UP to the target IAB-donor CU.

In step 1612, a Random Access procedure is performed at the target IAB-node DU.

In step 1613, the MT or the UE may respond to the target IAB-node DU with an RRCReconfigurationComplete message.

In step 1614, the target IAB-node DU may send an Uplink RRC Message Transfer message to the target IAB-donor CU to convey the received RRCReconfigurationComplete message.

In steps 1615-1616, a Path Switch Request procedure may be performed between core network and the target IAB-donor CU. Downlink packets may be sent to the MT or the UE. Also, uplink packets may be sent from the MT or the UE, which are forwarded to the target IAB-donor CU through the target IAB-node DU. For example, the UPF may transmit an End Marker Packet to the source IAB-donor CU-UP. The source IAB-donor CU-UP may transmit the End Marker Packet to the target IAB-donor CU.

In step 1617, the target IAB-donor CU may transmit an UE Context Release message to the source IAB-donor CU-CP.

In step 1618, the source IAB-donor CU-CP may send a Bearer Context Release Command message to the source IAB-donor CU-UP.

In step 1619, the source IAB-donor CU-CP may send an UE Context Release Command message to the source IAB-node DU.

In step 1620, the source IAB-node DU may release the MT context or the UE context and respond the source IAB-donor CU-CP with an UE Context Release Complete message.

In step 1621, the source IAB-donor CU-UP may transmit a Bearer Context Release Complete message to the source IAB-donor CU-CP.

Figure 17:
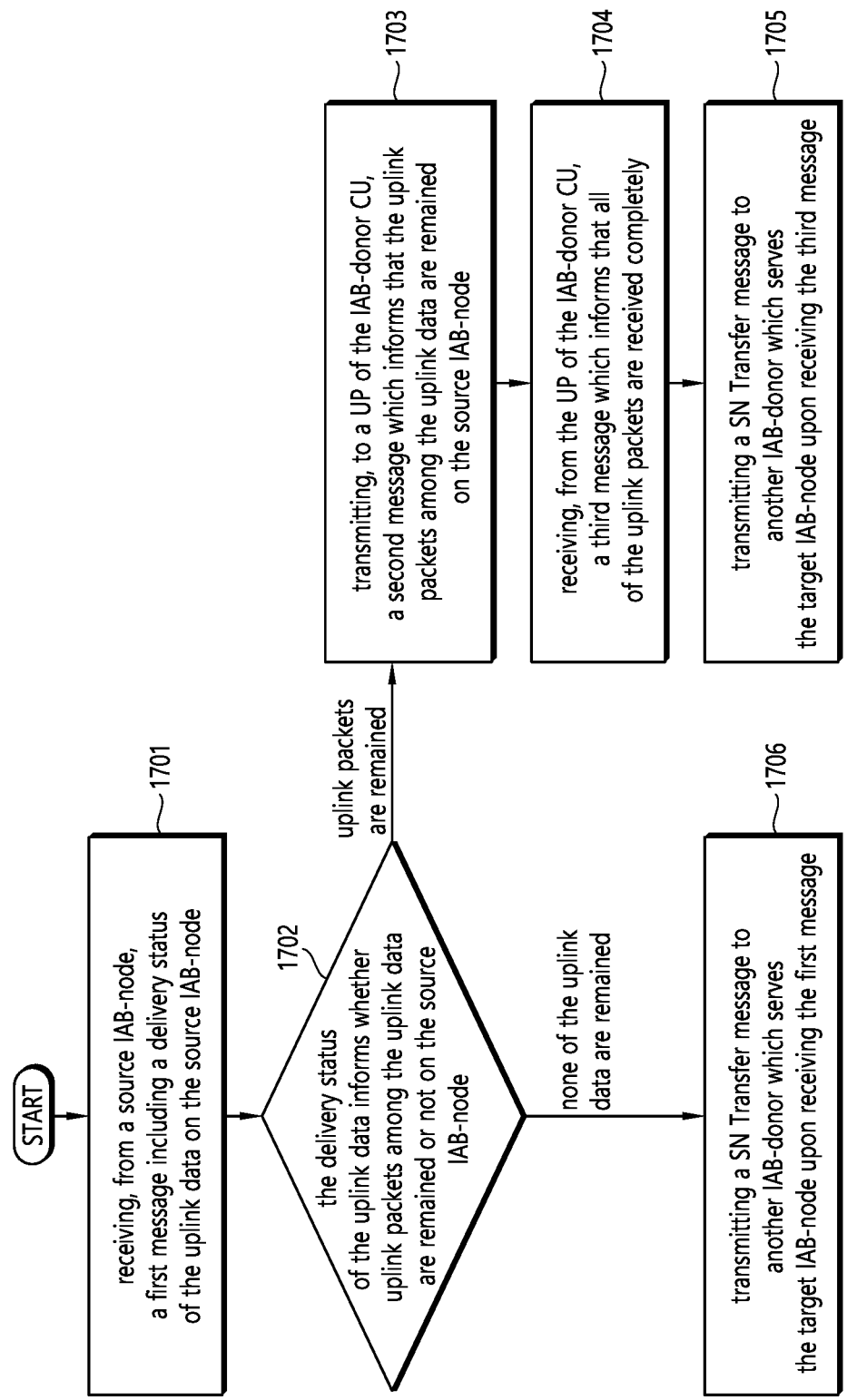
FIG. 17 shows an example of a method for lossless uplink data transmission of IAB network in a wireless communication system.

FIG. 17 shows an example of a method for lossless uplink data transmission of IAB network in a wireless communication system. In particular, FIG. 17 shows an example of a method performed by a control plane (UP) of an integrated access and backhaul (IAB)-donor central unit (CU) during a handover of a wireless device from a source IAB-node to a target IAB-node. In FIG. 17, a wireless device may perform a handover process from a source IAB-node DU to a target IAB-node DU. Herein, for convenience of the explanation, the source IAB-node DU and the target IAB-node DU may be referred to as a source IAB-node and a target IAB-node.

In step 1701, the CP of the IAB-donor CU may receive, from a source IAB-node, a first message including a delivery status of the uplink data on the source IAB-node.

For example, the first message may be a UE Context Modification Response, which is transmitted based on the handover of the wireless device.

In step 1702, the delivery status of the uplink data, received in step 1701, may inform whether uplink packets among the uplink data are remained or not on the source IAB-node. In other words the delivery status of the uplink data may inform whether all of the uplink data are transmitted completely, or not, to the CP of the IAB-donor CU.

For example, when the delivery status of the uplink data includes a Remaining UL Data indication, the CP of the IAB-donor CU may be informed that uplink packets among the uplink data are remained on the source IAB-node. Otherwise, when the delivery status of the uplink data includes a No UL Data indication, the CP of the IAB-donor CU may be informed that none of the uplink data are remained on the source IAB-node.

According to some embodiments of the present disclosure, only one of the Remaining UL Data indication and the No UL Data indication could be used.

For example, when the delivery status of the uplink data includes the Remaining UL Data indication, the CP of the IAB-donor CU may be informed that uplink packets among the uplink data are remained on the source IAB-node. Otherwise, when the delivery status of the uplink data does not include the Remaining UL Data indication, the CP of the IAB-donor CU may be informed that none of the uplink data are remained on the source IAB-node.

For other example, when the delivery status of the uplink data includes the No UL Data indication, the CP of the IAB-donor CU may be informed that none of the uplink data are remained on the source IAB-node. Otherwise, when the delivery status of the uplink data does not include the No UL Data indication, the CP of the IAB-donor CU may be informed that uplink packets among the uplink data are remained on the source IAB-node.

Referring to step 1702, if the delivery status of the uplink data informs that uplink packets among the uplink data are remained on the source IAB-node, steps 1703 to 1705 will be followed.

In step 1703, the CP of the IAB-donor CU may transmit, to a UP of the IAB-donor CU, a second message which informs that the uplink packets among the uplink data are remained on the source IAB-node. When the UP of the IAB-donor CU receives the second message, the UP of the IAB-donor CU may keep receiving the uplink data from the source IAB-node. For example, the second message may include a UL Data Incomplete Indication which informs that the uplink packets among the uplink data are remained on the source IAB-node.

For example, the second message may be a Bearer Context Modification Request message. In particular, the CP of the IAB-donor CU transmits the Bearer Context Modification Request message including the UL Data Incomplete Indication in response to a UE Context Modification Response message from the source IAB-node. The UE Context Modification Response message may be transmitted based on the handover procedure of the wireless device.

According to some embodiments of the present disclosure, the CP of the IAB-donor CU may suspend to transmit a SN Status Transfer message upon receiving the first message including a delivery status of the uplink data, based on that the delivery status of the uplink data informs that uplink packets among the uplink data are remained on the source IAB-node. The CP of the IAB-donor CU may suspend to transmit the SN Status Transfer message until the UP of the IAB-donor CU receives all of the uplink data from the source IAB-node.

In step 1704, the CP of the IAB-donor CU may receive a third message which informs that all of the uplink packets are received completely. For example, the CP of the IAB-donor CU may receive a UL Data Complete message or a UL Data Complete indication. The UL Data Complete message may be an existing message or a new message. The UL Data Complete indication may be included in an existing message or a new message.

In step 1705, the CP of the IAB-donor CU may transmit a SN Status Transfer message to another IAB-donor which serves the target IAB-node upon receiving the third message. For example, the CP of the IAB-donor CU may transmit a SN Status Transfer message to another IAB-donor which serves the target IAB-node after receiving the third message.

According to some embodiments of the present disclosure, the CP of the IAB-donor CU may perform other handover procedures instead of transmitting the SN Status Transfer message upon receiving the third message. For example, in an intra-IAB-donor CU handover case, the source IAB-node connected to a source IAB-donor DU and the target IAB-node connected to a target IAB-donor DU may be served by a same IAB-donor CU. In this case, the CP of the IAB-donor CU may transmit, to the source IAB-node, a UE Context Release Command, instead of transmitting the SN Status Transfer message, after receiving the third message, as described in step 1705.

Referring to step 1702, if the delivery status of the uplink data informs that none of the uplink data are remained on the source IAB-node, step 1706 will be followed.

In step 1706, the CP of the IAB-donor CU may transmit a SN Status Transfer message to another IAB-donor which serves the target IAB-node upon receiving the first message from the source IAB-node. Since the CP of the IAB-donor CU may not need to wait receiving all of the uplink data from the UP of the IAB-donor CU.

For example, the CP of the IAB-donor CU may proceeding the handover procedure, since all of the uplink data is transmitted to the UP of the IAB-donor CU completely. The CP of the IAB-donor CU may transmit a Bearer Context Modification Request message without the UL Data Incomplete indication to the UP of the IAB-donor CU. The CP of the IAB-donor CU may receive a Bearer Context Modification Response from the UP of the IAB-donor CU. The CP of the IAB-donor CU may transmit the SN Status Transfer message after receiving the Bearer Context Modification Response.

According to some embodiments of the present disclosure, the CP of the IAB-donor CU may perform other handover procedures instead of transmitting the SN Status Transfer message upon receiving the first message. For example, in the intra-IAB-donor CU handover case, the CP of the IAB-donor CU may transmit, to the source IAB-node, a UE Context Release Command, instead of transmitting the SN Status Transfer message, after receiving the first message, as described in step 1706.

Figure 18A:
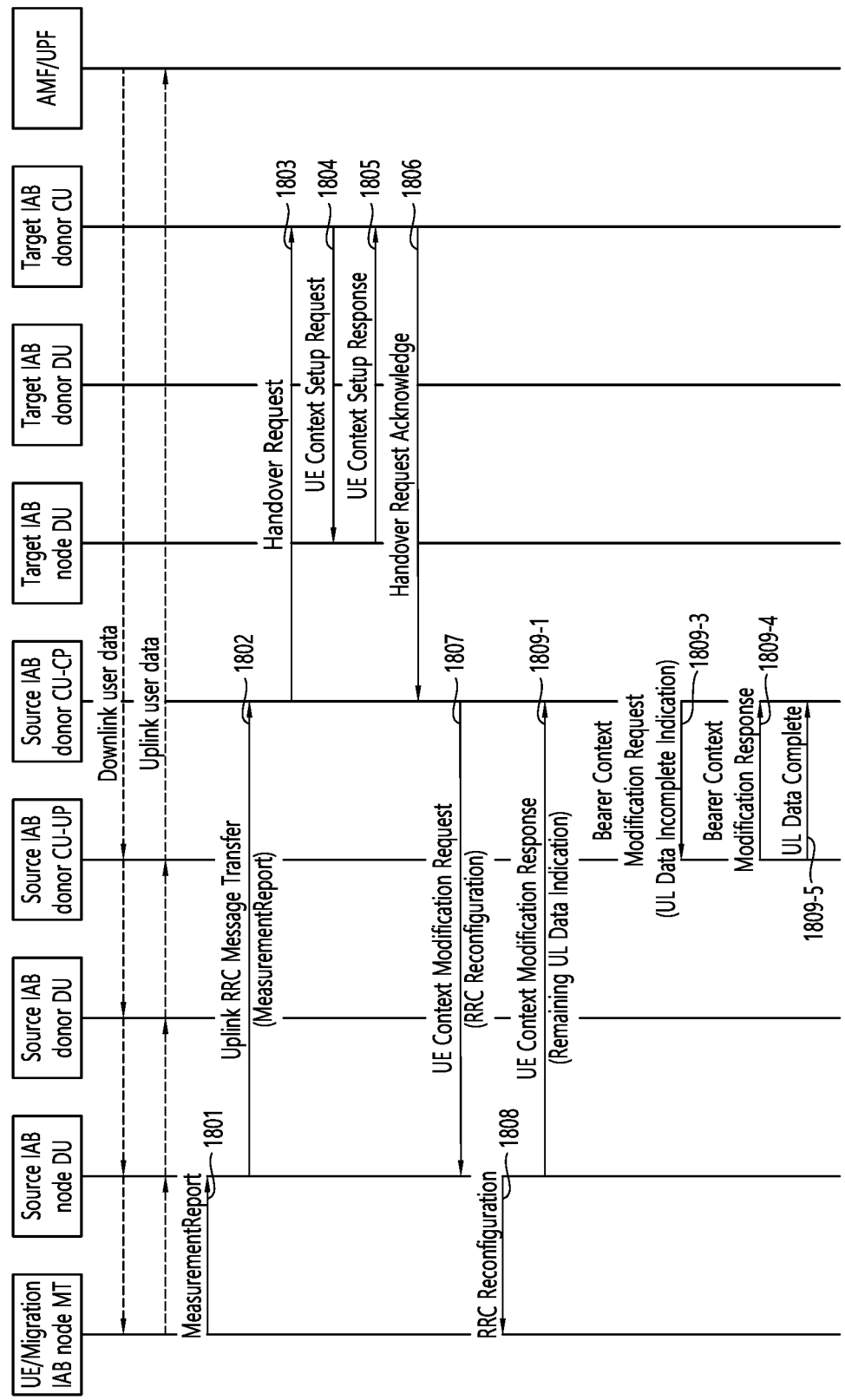
FIGS. 18A and 18B show a flow chart for an example of a method for lossless uplink data transmission of IAB network in a wireless communication system.
Figure 18B:
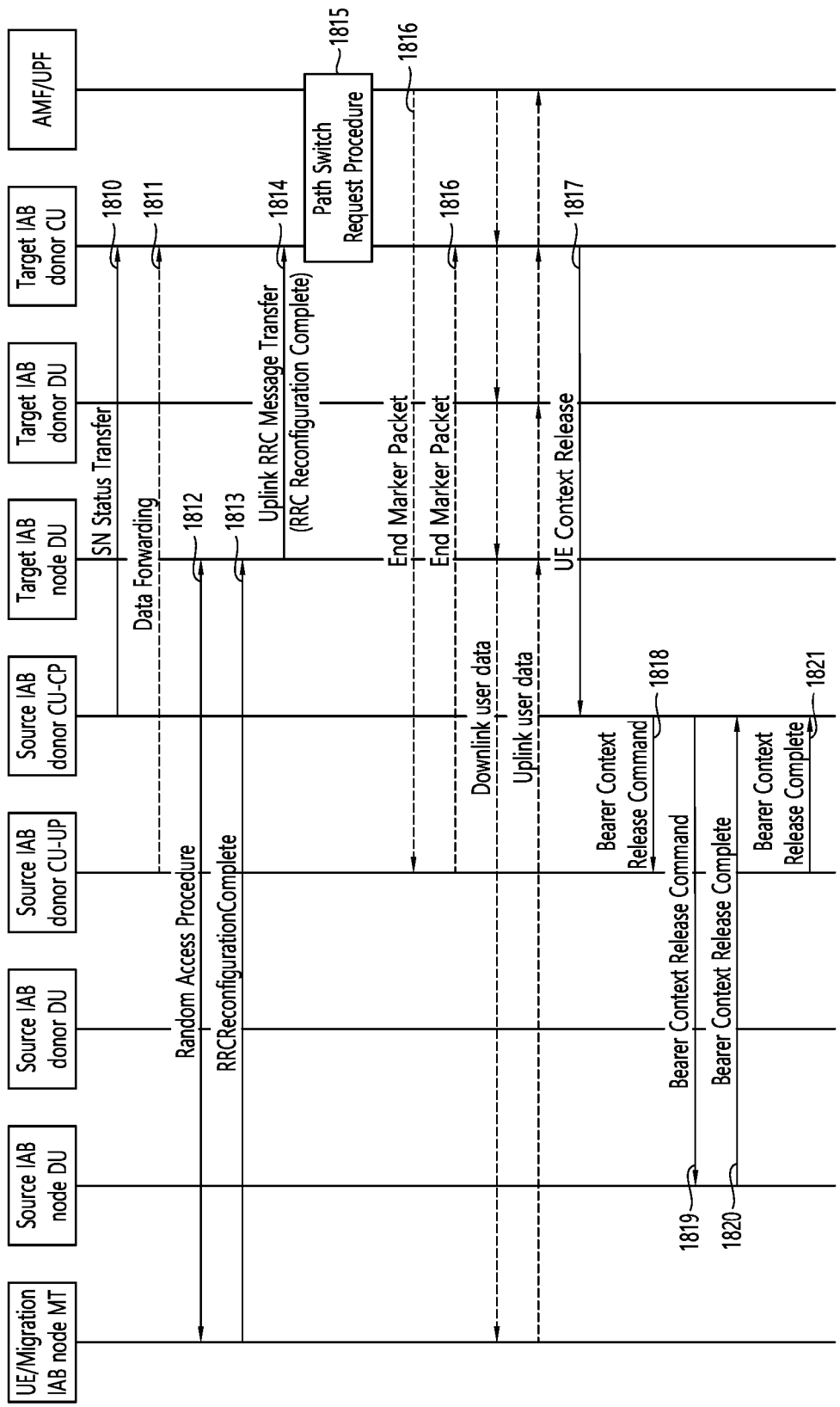

FIGS. 18A and 18B show a flow chart for an example of a method for lossless uplink data transmission of IAB network in a wireless communication system. In particular, FIGS. 18A and 18B show a method for lossless uplink data transmission performed by a CU-CP of an IAB-donor during inter-donor CU handover procedure involving parent IAB-node change. The description of the same parts as those described above with reference to FIGS. 18A and 18B will be simplified or omitted for convenience of the explanation.

In FIGS. 18A and 18B, a wireless device may be referred as a UE or a migrating IAB-node MT. A wireless device may downlink user data from the user plane function (UPF). A wireless device may transmit uplink user data to the UPF.

In step 1801, the migrating IAB-node MT or the UE may send a MeasurementReport message to the source IAB-node DU.

In step 1802, the source IAB-node DU may transmits an Uplink RRC Message Transfer message to the source IAB-donor CU-CP to convey the received MeasurementReport message.

In step 1803, the source IAB-donor CU-CP may send a XnAP Handover Request message to the target IAB-donor CU.

In step 1804, the target IAB-donor CU may transmit an UE Context Setup Request message to the target IAB-node DU to create an MT context or an UE context, and setup one or more bearers.

In step 1805, the target IAB-node DU may respond to the target IAB-donor CU with an UE Context Setup Response message.

In step 1806, the target IAB-donor CU may respond the source IAB-donor CU-CP with an XnAP Handover Request Acknowledge message.

In step 1807, the source IAB-donor CU-CP may send an UE Context Modification Request message to the source IAB-node DU.

In step 1808, the source IAB-node DU may forward the received RRCReconfiguration message to the MT or the UE.

In this example, the signaling over F1-C may be used for lossless uplink data transmission.

In step 1809-1, the source IAB-node DU may respond to the source IAB-donor CU-CP with an UE Context Modification Response message including the Remaining UL Data Indication. The Remaining UL Data Indication may inform the source IAB-donor CU-CP that there are uplink packets to be transmitted. The UE Context Modification Response message may include the uplink data related information (e.g., UE ID, Bearer ID, PDCP sequence number of transmitted uplink packets, PDCP sequence number of uplink packets to be transmitted, RLC sequence number assigned by the UE/the IAB-node DU for transmitted uplink packets, and/or RLC sequence number assigned by the UE/the IAB-node DU for uplink packets to be transmitted).

In step 1809-2, if the source IAB-donor CU-CP receives UE Context Modification Response message including the Remaining UL Data Indication from the source IAB-node DU, the source IAB-donor CU-CP may send to the source IAB-donor CU-UP a Bearer Context Modification Request message including the UL Data Incomplete Indication. The UL Data Incomplete Indication may indicate that there are uplink packets to be transmitted from the source IAB-node DU. The Bearer Context Modification Request message may include the uplink data related information received in step 1809-1. The source IAB-donor CU-CP may not send a SN Status Transfer message to the target IAB-donor CU until receiving an UL Data complete indication from the source IAB-donor CU-UP.

According to some embodiments of the present disclosure, the source IAB-donor CU-CP receives UE Context Modification Response message without the Remaining UL Data Indication from the source IAB-node DU. For example, the source IAB-donor CU-CP receives UE Context Modification Response message including the UL Data Complete Indication from the source IAB-node DU. In this case, the source IAB-donor CU-CP may transmit a SN Status Transfer message to the target IAB-donor CU, without performing steps 1809-3 and 1809-4 as below.

In step 1809-3, on receiving the a Bearer Context Modification Request message, the source IAB-donor CU-UP may check whether all of indicated uplink data are received or not based on the information received from the source IAB-donor CU-CP. The source IAB-donor CU-UP may transmit a Bearer Context Modification Response message to the source IAB-donor CU-CP.

In step 1809-4, when all of indicated uplink packets are received, the source IAB-donor CU-UP may send, to the source IAB-donor CU-CP, an UL Data Complete message or indication. The UL Data Complete message may be an existing or a new message. The UL Data Complete indication may be included in an existing or a new message.

The UL Data Complete message or indication may inform that the source IAB-donor CU-UP completely receives all of indicated uplink packets.

In step 1810, after receiving the UL Data Complete message or indication, the source IAB-donor CU-CP may send a SN Status Transfer message to the target IAB-donor CU.

In step 1811, Data Forwarding may be performed from the source IAB-donor CU-UP to the target IAB-donor CU.

In step 1812, a Random Access procedure is performed at the target IAB-node DU.

In step 1813, the MT or the UE may respond to the target IAB-node DU with an RRCReconfigurationComplete message.

In step 1814, the target IAB-node DU may send an Uplink RRC Message Transfer message to the target IAB-donor CU to convey the received RRCReconfigurationComplete message.

In steps 1815-1816, a Path Switch Request procedure may be performed between core network and the target IAB-donor CU. The UPF may transmit an End Marker Packet to the source IAB-donor CU-UP. The source IAB-donor CU-UP may transmit the End Marker Packet to the target IAB-donor CU.

In step 1817, the target IAB-donor CU may transmit an UE Context Release message to the source IAB-donor CU-CP.

In step 1818, the source IAB-donor CU-CP may send a Bearer Context Release Command message to the source IAB-donor CU-UP.

In step 1819, the source IAB-donor CU-CP may send an UE Context Release Command message to the source IAB-node DU.

In step 1820, the source IAB-node DU may release the MT context or the UE context and respond the source IAB-donor CU-CP with an UE Context Release Complete message.

In step 1821, the source IAB-donor CU-UP may transmit a Bearer Context Release Complete message to the source IAB-donor CU-CP.

According to some embodiments of the present disclosure, the method described herein could be used in case when a wireless device migrates from a source IAB-node served by a source IAB-donor DU to a target IAB-node served by a target IAB-donor DU, wherein both source IAB-donor DU and the target IAB-donor DU are connected to same IAB-donor CU. In other words, the source IAB-node connected to a source IAB-donor DU and the target IAB-node connected to a target IAB-donor DU may be served by a same IAB-donor CU.

In this case, a CP of the IAB-donor CU may perform other handover procedures instead of transmitting the SN Status Transfer message upon receiving the third message. For example, the CP of the IAB-donor CU may transmit, to the source IAB-node, a UE Context Release Command, instead of transmitting the SN Status Transfer message, after confirming that all of uplink data from the wireless device is received by a UP of the IAB-donor CU.

According to some embodiments of the present disclosure described with reference to FIGS. 15, 16A, 16B, 17, 18A, and 18B, the source IAB-donor CU (for example, CU-CP or CU-UP) could know uplink data which the source IAB-node DU receives from the migrating IAB-node MT or the UE and does not transmit yet through a feedback of the UP or a feedback of the CP.

That is, according to some embodiments of the present disclosure, a CU of an IAB-donor may recognize a part of uplink data are remained on a DU of an IAB-node between a wireless device and the CU of the IAB-donor, during handover procedure of the wireless device, in multi-hop wireless backhaul system.

Therefore, it is possible to perform inter-donor CU handover involving parent IAB-node change without loss of uplink data received from the migrating IAB-node MT or the UE.

In addition, methods described herein could make the experience of the wireless device better (e.g. smooth and seamless IAB-node DU change or handover). The methods described herein could also facilitate the RAN node to handle the data packets better for a specific wireless device during the IAB-node DU change or the handover.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 19:
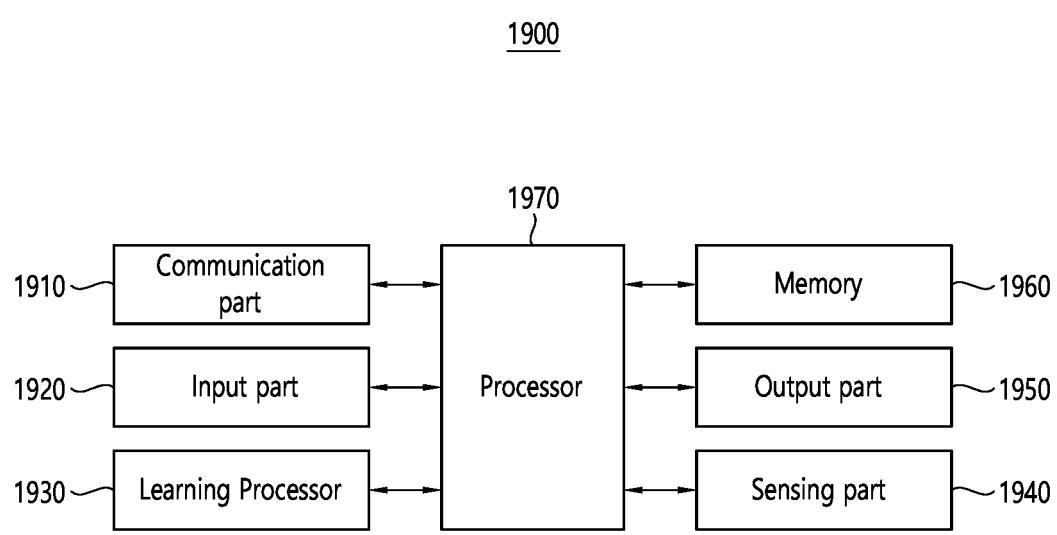
FIG. 19 shows an example of an AI device to which the technical features of the present disclosure can be applied.

FIG. 19 shows an example of an AI device to which the technical features of the present disclosure can be applied.

The AI device 1900 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 19, the AI device 1900 may include a communication part 1910, an input part 1920, a learning processor 1930, a sensing part 1940, an output part 1950, a memory 1960, and a processor 1970.

The communication part 1910 can transmit and/or receive data to and/or from external devices such as the AI devices and the AI server using wire and/or wireless communication technology. For example, the communication part 1910 can transmit and/or receive sensor information, a user input, a learning model, and a control signal with external devices. The communication technology used by the communication part 1910 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1920 can acquire various kinds of data. The input part 1920 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1920 can acquire input data to be used when acquiring an output using learning data and a learning model for model learning. The input part 1920 may obtain raw input data, in which case the processor 1970 or the learning processor 1930 may extract input features by preprocessing the input data.

The learning processor 1930 may learn a model composed of an ANN using learning data. The learned ANN can be referred to as a learning model. The learning model can be used to infer result values for new input data rather than learning data, and the inferred values can be used as a basis for determining which actions to perform. The learning processor 1930 may perform AI processing together with the learning processor of the AI server. The learning processor 1930 may include a memory integrated and/or implemented in the AI device 1900. Alternatively, the learning processor 1930 may be implemented using the memory 1960, an external memory directly coupled to the AI device 1900, and/or a memory maintained in an external device.

The sensing part 1940 may acquire at least one of internal information of the AI device 1900, environment information of the AI device 1900, and/or the user information using various sensors. The sensors included in the sensing part 1940 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1950 may generate an output related to visual, auditory, tactile, etc. The output part 1950 may include a display unit for outputting visual information, a speaker for outputting auditory information, and/or a haptic module for outputting tactile information.

The memory 1960 may store data that supports various functions of the AI device 1900. For example, the memory 1960 may store input data acquired by the input part 1920, learning data, a learning model, a learning history, etc.

The processor 1970 may determine at least one executable operation of the AI device 1900 based on information determined and/or generated using a data analysis algorithm and/or a machine learning algorithm. The processor 1970 may then control the components of the AI device 1900 to perform the determined operation. The processor 1970 may request, retrieve, receive, and/or utilize data in the learning processor 1930 and/or the memory 1960, and may control the components of the AI device 1900 to execute the predicted operation and/or the operation determined to be desirable among the at least one executable operation. The processor 1970 may generate a control signal for controlling the external device, and may transmit the generated control signal to the external device, when the external device needs to be linked to perform the determined operation. The processor 1970 may obtain the intention information for the user input and determine the user's requirements based on the obtained intention information. The processor 1970 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1930 and/or learned by the learning processor of the AI server, and/or learned by their distributed processing. The processor 1970 may collect history information including the operation contents of the AI device 1900 and/or the user's feedback on the operation, etc. The processor 1970 may store the collected history information in the memory 1960 and/or the learning processor 1930, and/or transmit to an external device such as the AI server. The collected history information can be used to update the learning model. The processor 1970 may control at least some of the components of AI device 1900 to drive an application program stored in memory 1960. Furthermore, the processor 1970 may operate two or more of the components included in the AI device 1900 in combination with each other for driving the application program.

Figure 20:
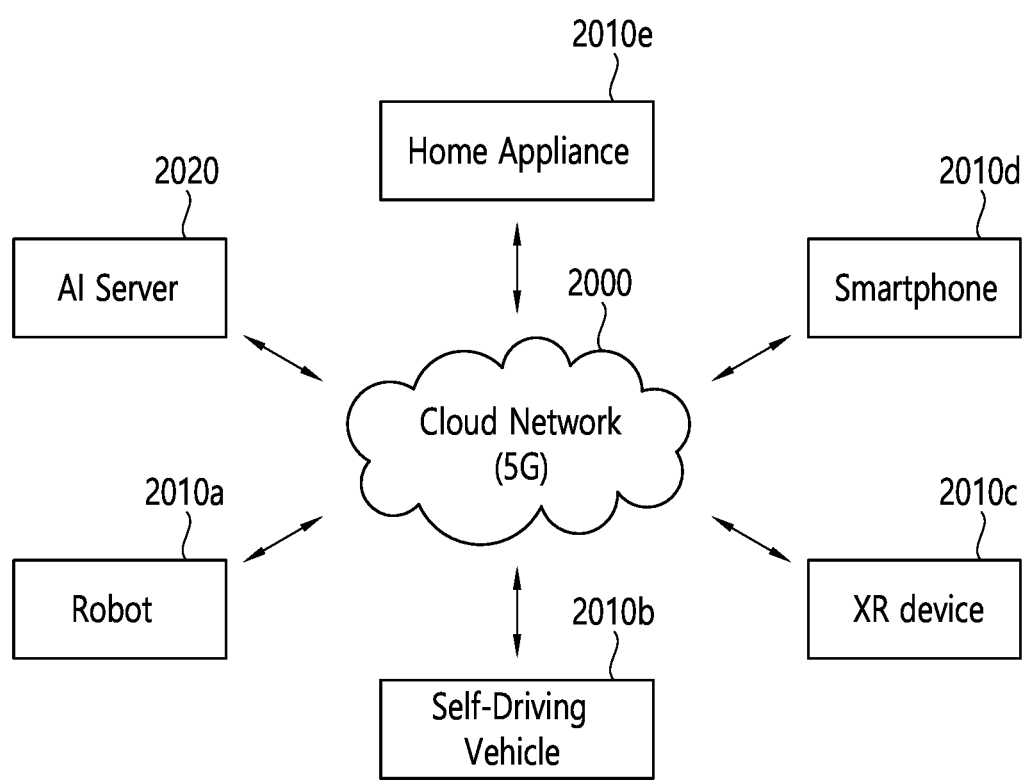
FIG. 20 shows an example of an AI system to which the technical features of the present disclosure can be applied.

FIG. 20 shows an example of an AI system to which the technical features of the present disclosure can be applied.

Referring to FIG. 20, in the AI system, at least one of an AI server 2020, a robot 2010a, an autonomous vehicle 2010b, an XR device 2010c, a smartphone 2010d and/or a home appliance 2010e is connected to a cloud network 2000. The robot 2010a, the autonomous vehicle 2010b, the XR device 2010c, the smartphone 2010d, and/or the home appliance 2010e to which the AI technology is applied may be referred to as AI devices 2010a to 2010e.

The cloud network 2000 may refer to a network that forms part of a cloud computing infrastructure and/or resides in a cloud computing infrastructure. The cloud network 2000 may be configured using a 3G network, a 4G or LTE network, and/or a 5G network. That is, each of the devices 2010a to 2010e and 2020 consisting the AI system may be connected to each other through the cloud network 2000. In particular, each of the devices 2010a to 2010e and 2020 may communicate with each other through a base station, but may directly communicate with each other without using a base station.

The AI server 2020 may include a server for performing AI processing and a server for performing operations on big data. The AI server 2020 is connected to at least one or more of AI devices constituting the AI system, i.e. the robot 2010a, the autonomous vehicle 2010b, the XR device 2010c, the smartphone 2010d and/or the home appliance 2010e through the cloud network 2000, and may assist at least some AI processing of the connected AI devices 2010a to 2010e. The AI server 2020 can learn the ANN according to the machine learning algorithm on behalf of the AI devices 2010a to 2010e, and can directly store the learning models and/or transmit them to the AI devices 2010a to 2010e. The AI server 2020 may receive the input data from the AI devices 2010a to 2010e, infer the result value with respect to the received input data using the learning model, generate a response and/or a control command based on the inferred result value, and transmit the generated data to the AI devices 2010a to 2010e. Alternatively, the AI devices 2010a to 2010e may directly infer result value for the input data using a learning model, and generate a response and/or a control command based on the inferred result value.

Various embodiments of the AI devices 2010a to 2010e to which the technical features of the present disclosure can be applied will be described. The AI devices 2010a to 2010e shown in FIG. 20 can be seen as specific embodiments of the AI device 1900 shown in FIG. 19.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user plane (UP) of an integrated access and backhaul (IAB)-donor central unit (CU) in a wireless communication system, the method comprising:
   receiving, from a wireless device, uplink data through a source IAB-node;
   receiving, from the wireless device, a measurement report through the source IAB-node;
   transmitting, to the wireless device, a Radio Resource Control (RRC) reconfiguration through the source IAB-node;
   receiving, from the source IAB-node, a Downlink Data Delivery Status message including (i) a Remaining UL Data Indication and (ii) information related to uplink data on the source IAB-node,
   wherein the Remaining UL Data Indication informs that there are uplink packets to be transmitted,
   wherein the information related to the uplink data includes information on an identity (ID) of the wireless device, a Bearer ID, at least one Packet Data Convergence Protocol (PDCP) sequence number of the uplink packets to be transmitted, and/or a Radio Link Control (RLC) sequence number assigned for the uplink packets to be transmitted;
   wherein the wireless device handovers from the source IAB-node to a target IAB-node;
   transmitting, to a unit-control plane (CP) of the IAB-donor CU, an UL Data Incomplete Indication informing not to transmit a SN Status Transfer message;
   receiving the uplink packets to be transmitted from the source IAB-node; and
   based on that uplink transmission for the uplink packets to be transmitted is completed, transmitting an UL DATA Complete Indication to the CP of the IAB-donor CU.

* * * * *